United States Patent [19]
Farley et al.

[11] Patent Number: 5,117,289
[45] Date of Patent: May 26, 1992

[54] REAL-TIME VIDEO IMAGE CONVERTER

[75] Inventors: Shal W. Farley, Arcadia; William McCown, So. Pasadena, both of Calif.

[73] Assignee: Lyon-Lamb Video Animation, Burbank, Calif.

[21] Appl. No.: 515,002

[22] Filed: Apr. 26, 1990

[51] Int. Cl.$^5$ .............................................. H04N 7/01
[52] U.S. Cl. ...................................... 358/140; 358/11
[58] Field of Search .................................. 358/140, 11

[56] References Cited

U.S. PATENT DOCUMENTS

| | | | |
|---|---|---|---|
| 4,179,705 | 12/1979 | Faroudja | 358/31 |
| 4,240,105 | 12/1980 | Faroudja | 358/31 |
| 4,654,696 | 3/1987 | Dayton et al. | 358/11 |
| 4,677,483 | 6/1987 | Dischert et al. | 358/140 |
| 4,694,337 | 9/1987 | Lyons | 358/140 |
| 4,703,353 | 10/1987 | David | 358/140 |
| 4,706,112 | 11/1987 | Faroudja et al. | 358/31 |
| 4,797,746 | 1/1989 | Ashcraft | 358/140 |
| 4,816,898 | 3/1989 | Farley et al. | 358/11 |
| 4,837,619 | 6/1989 | Tsinberg | 358/140 |
| 4,885,631 | 12/1989 | Fukinuri | 358/11 |

Primary Examiner—Howard W. Britton
Attorney, Agent, or Firm—Lyon & Lyon

[57] ABSTRACT

The invention provides a device which converts an image from a first image format to a second image format in real time. A stream of image data in the first image format is processed by a horizontal filter to convert a horizontal resolution of the image to the horizontal resolution of the second image format. After such processing, the horizontal filtered data is buffered by a plurality of frame buffers in a controlled timing sequence to convert a frame rate of the image to the frame rate of the second image format. After such processing, the buffered data is processed by a vertical filter to convert a vertical resolution of the image to the vertical resolution of the second image format.

7 Claims, 22 Drawing Sheets

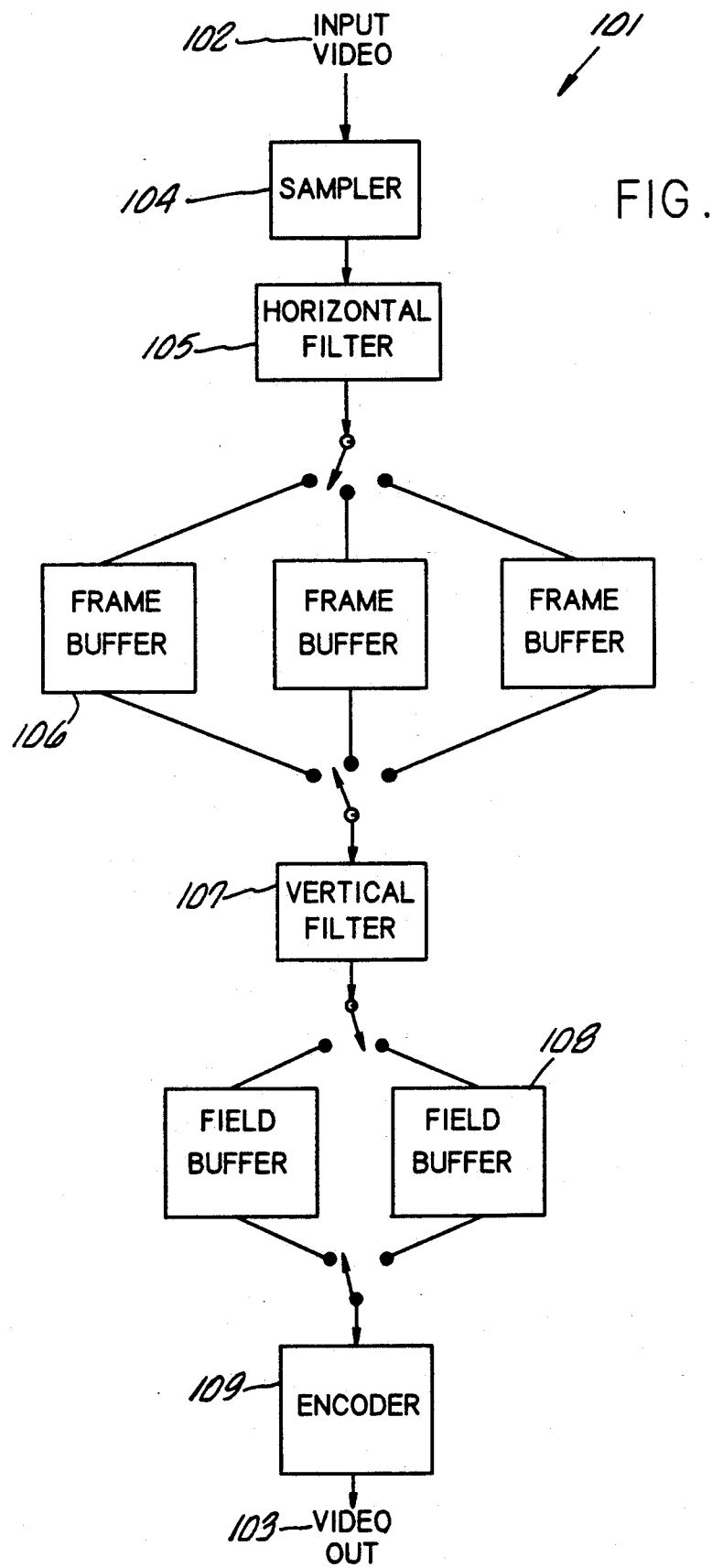

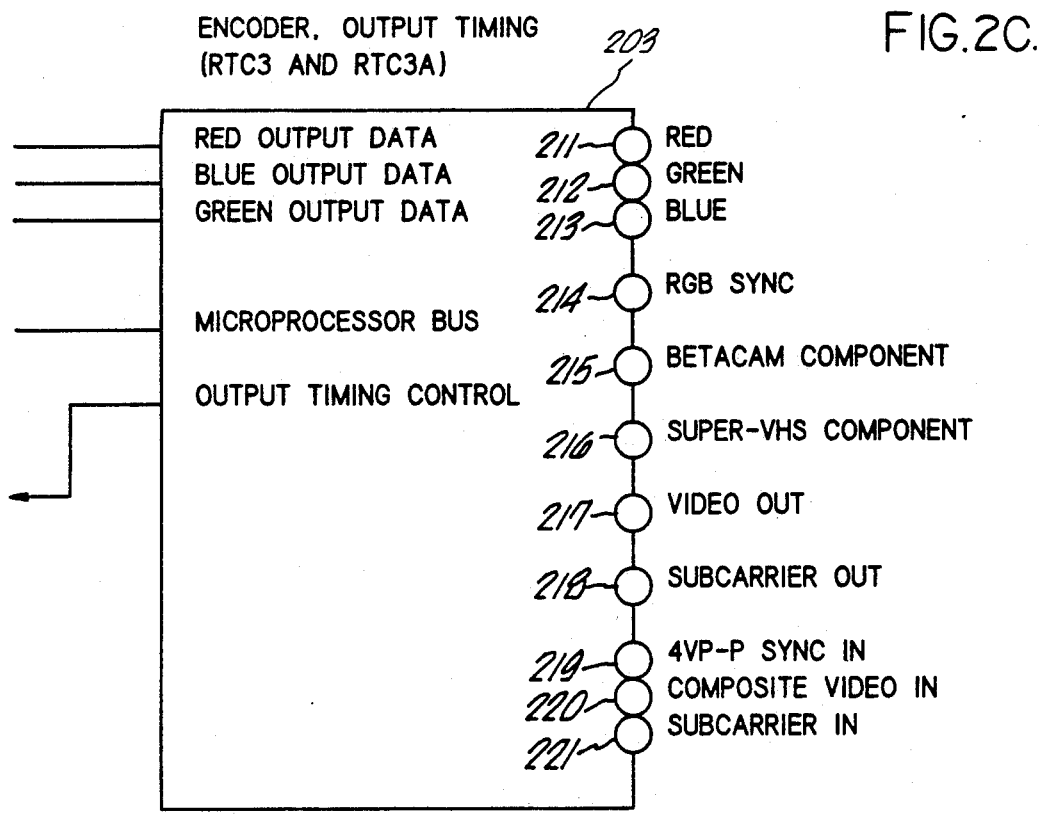
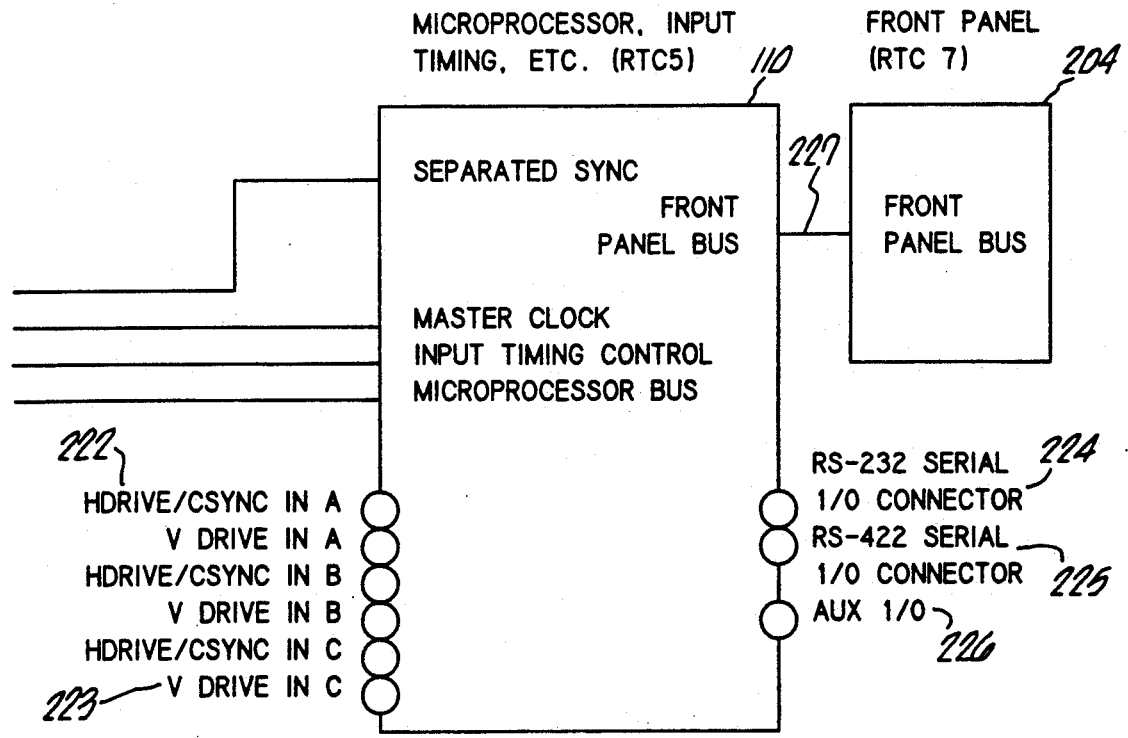
FIG.2C.

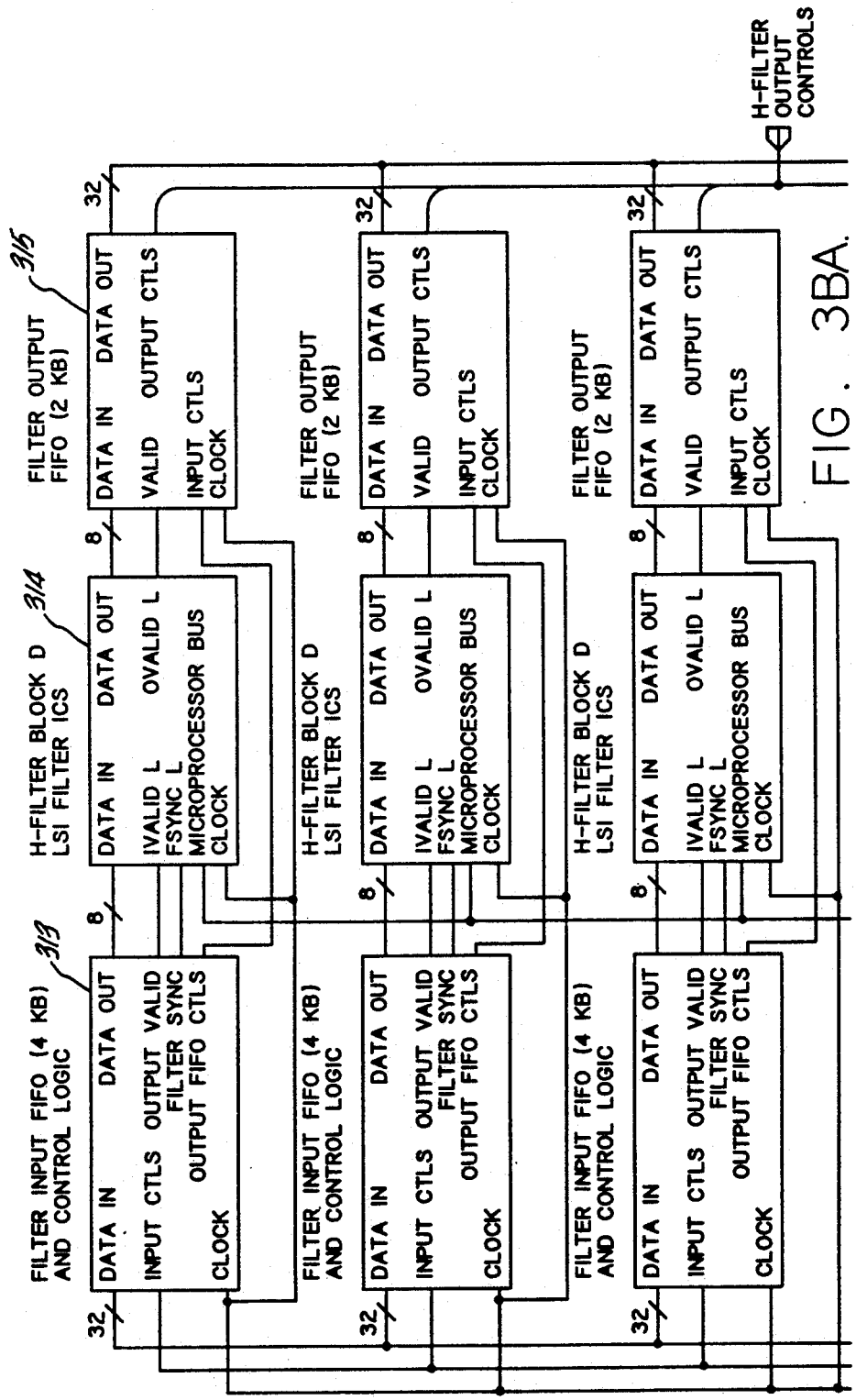

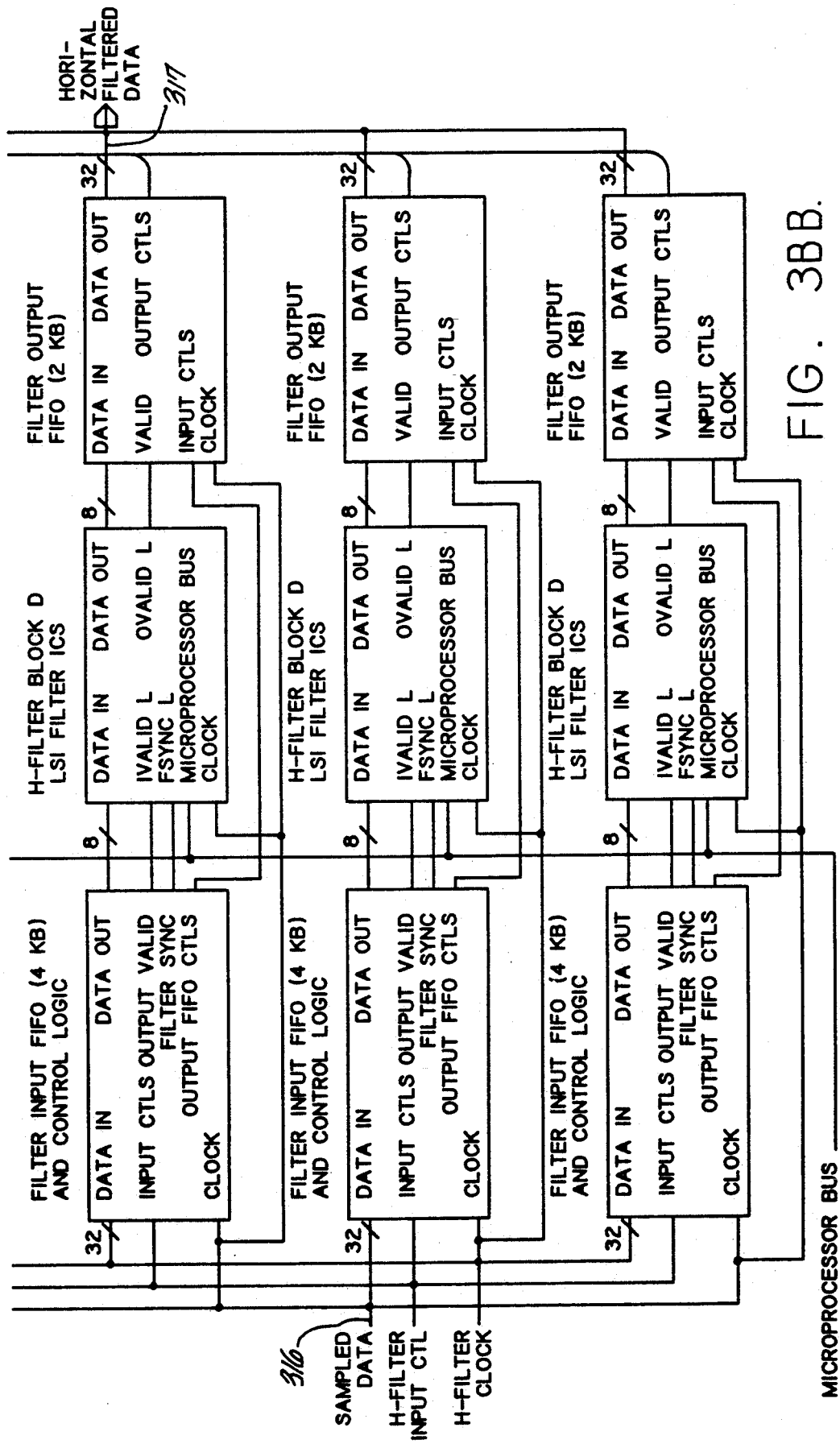

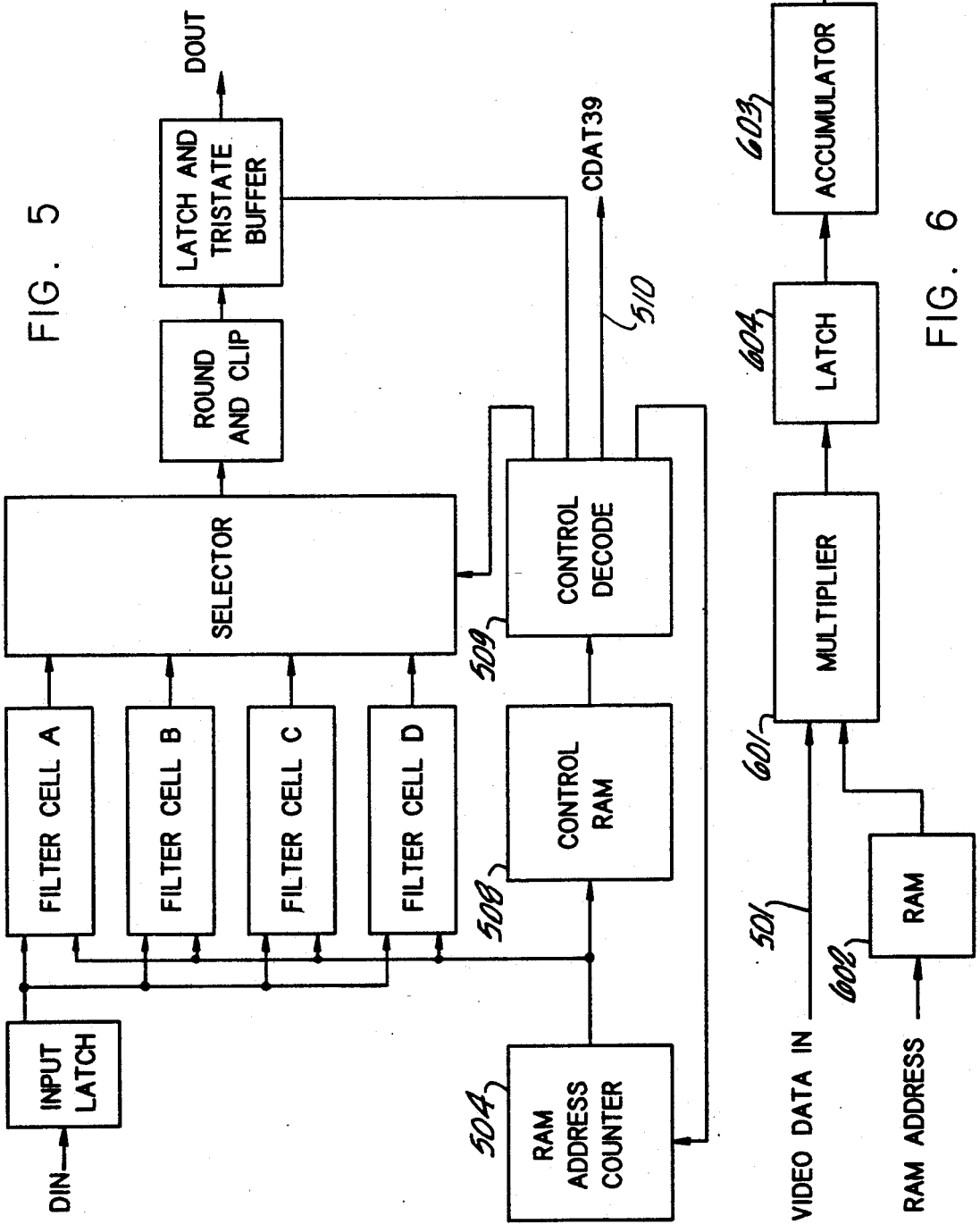

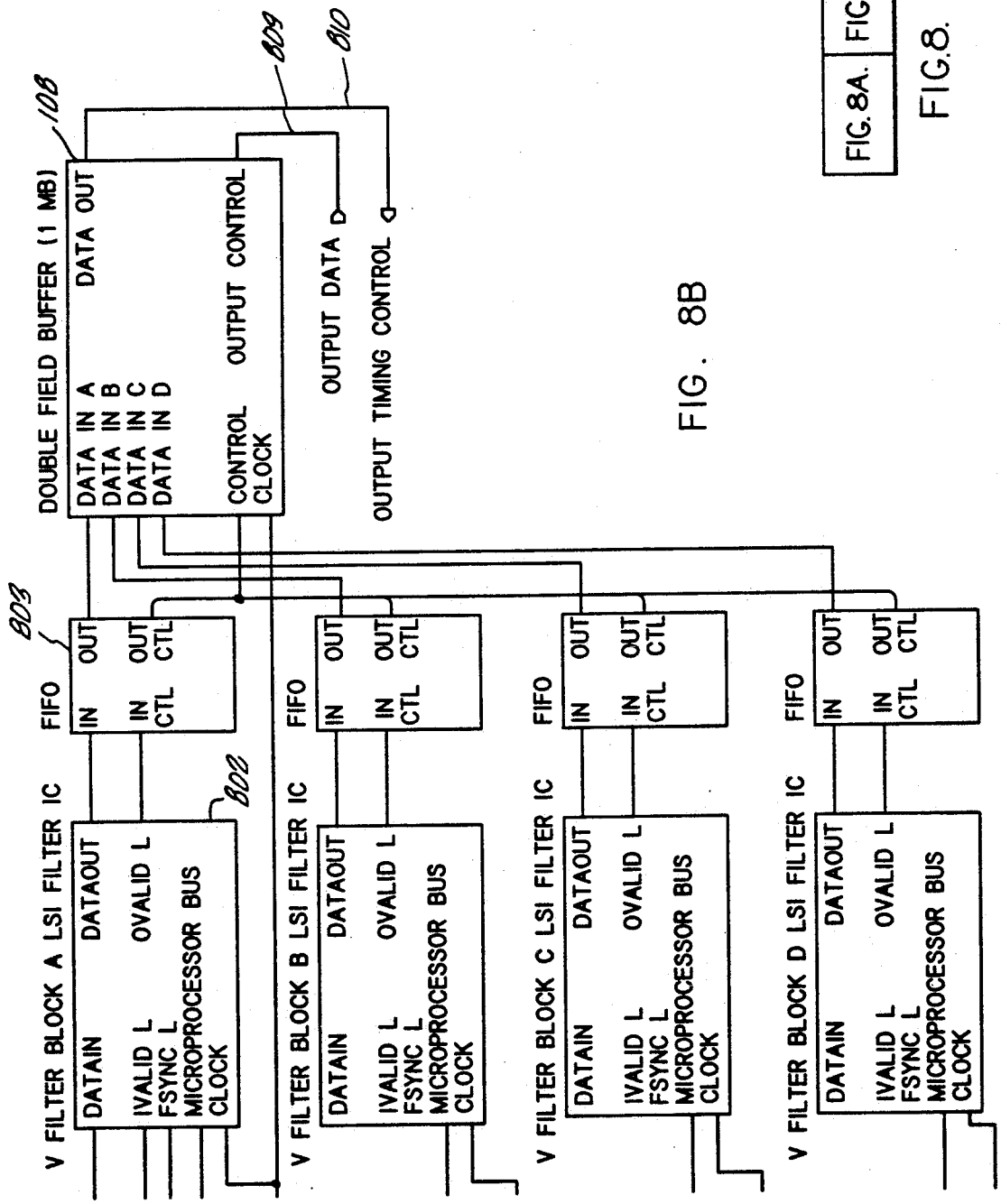

EVEN FRAME     ODD FRAME

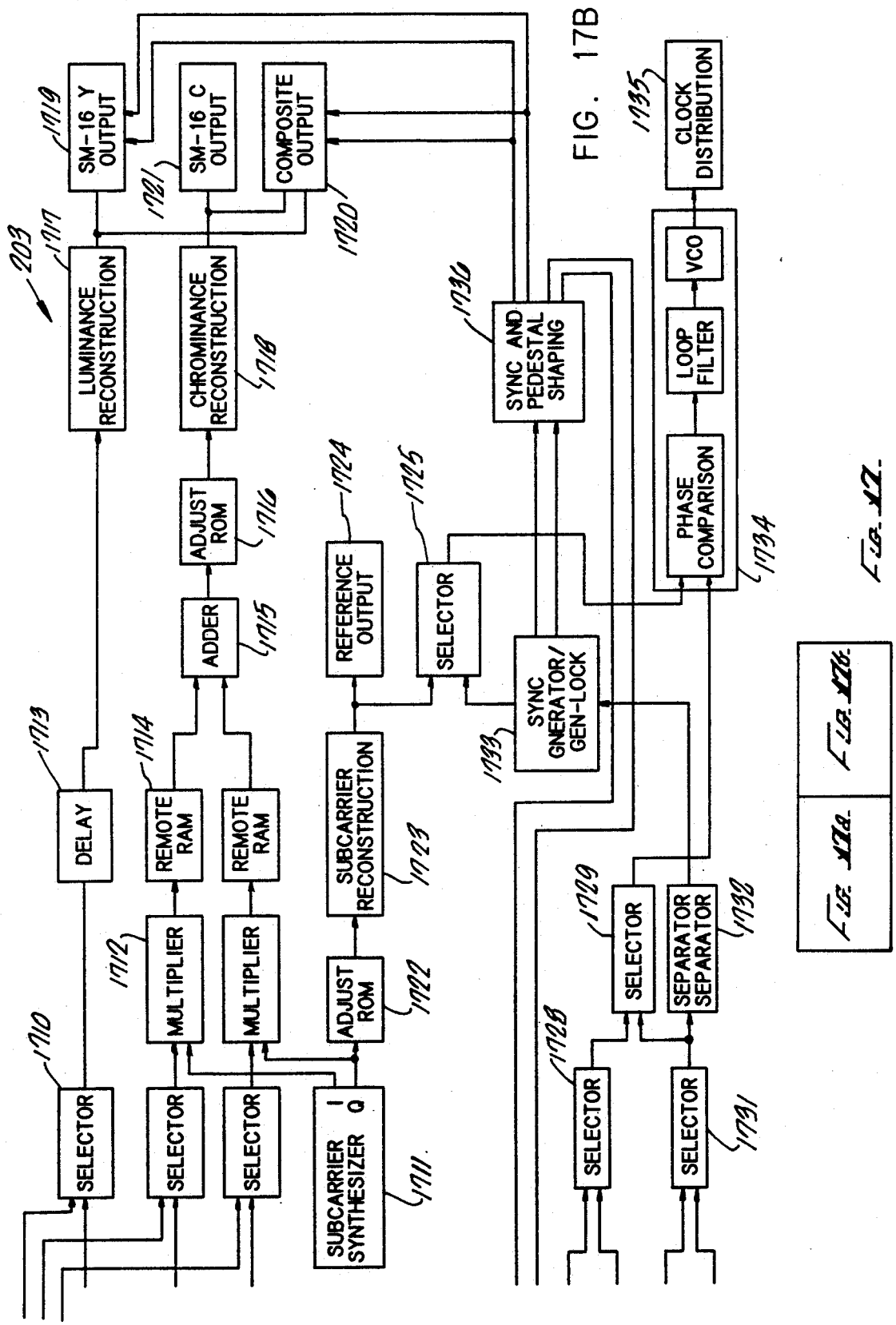

1904 ( A )
    ( B )         1905
    ( C )       (TEST)      (FREEZE) 1907      1906 (STATUS)  1901
                ┌─────────────────────────────────────────────┐
                │ A B C D E F G H I J K L M N O P Q R S T U V W X Y Z a b c d e f g h i j k l m n l │  } 1902
                │ 0 1 2 3 4 5 6 7 8 9 0 1 2 3 4 5 6 7 8 9 0 1 2 3 4 5 6 7 8 9 0 1 2 3 4 5 6 7 8 9 l │
                └─────────────────────────────────────────────┘
  ( - - )           ( - )           ( + )           ( + + )  } 1903

(SETUP) 1908
         (PREV)                    (NEXT)
          1909                      1909

FIG. 19

REAL-TIME VIDEO IMAGE CONVERTER

BACKGROUND OF THE INVENTION

1. Field of the Invention

This invention relates to video image converters. More specifically, this invention relates to video image converters which operate in real time, such as at the rate of reception of an image in an input video image format (such as an input television video image signal), and to a component filter circuit for interpolating points in a horizontal and a vertical direction in the image.

2. Description of Related Art

Some advantages which may be obtained from converting video images from a one image format to another are disclosed in a related application titled "DIGITAL VIDEO IMAGE CONVERTER", now issued as U.S. Pat. No. 4,816,898. It is also advantageous to be able to convert images in real time. As used herein, converting images in "real time" means that as an input image is received, it is converted to an output image about as quickly as it is received, or at the least, that output image frames are generated quickly enough that a viewer does not notice a great deal of jerkiness. There are many advantages and applications of real-time conversion which are well known in the art.

One problem in the art is that real-time conversion of video images from one image format to another requires a great deal of computing power and memory storage, and may be impractical in its most general form. Moreover, the most general form of this computation is not thought to be easily approached by parallel computing techniques.

One known solution to this problem is to convert images by directing a video camera at a high-resolution monitor. While this method does alter the resolution in real time, but it has problems with linearity (i.e., it has a tendency to reproduce straight lines improperly) and it has a tendency to introduce aliasing (e.g., moiré patterns or beat frequencies), both spatially (i.e., in the image) and temporally (i.e., flicker).

A second known solution is to just delete half (or some other fraction) of the input scan lines, and half the pixels in each scan line, typically by digital means. An enhancement of this technique is to delete pixels pseudo-randomly until only a correct number remain. While this method does alter resolution in real time, it is subject to problems produced by just deleting information, such as spatial aliasing. Also, small image features, such as thin lines, may be entirely lost.

A third known solution is to average successive pairs (or some other number, such as triplets) of lines to arrive at a lower-resolution image. However, this method is generally restricted to a fixed conversion ratio, such as 2:1 or 3:1, often requiring that portions of the image must be discarded to fit onto a standard monitor or within a standard television signal.

Another problem in the art is that known methods of real-time image conversion are narrowly tailored for a particular image format or a narrow range of image formats. This may make it difficult or impossible to operate such devices with other image formats. Even if it is possible to operate such devices with differing image formats, it may be difficult or impossible to quickly adjust such a device to change its image format. For example, known methods of real-time image conversion typically rely heavily on hardware devices whose conversion parameters are effectively fixed, either by the nature of their design or by the nature of the conversion method they use.

Accordingly, there is a need for video image converters (1) which can perform conversion of images from a source image format to a target image format in real time; and (2) which can perform conversion of images for a wide range of image formats and which can be adjusted to perform conversion of images for new image formats by reprogramming of software elements. There is a substantial advantage to be obtained from components of a video image converter which may perform data filtering in a horizontal and a vertical direction for the image at high speed and with a substantial degree of parallelism.

SUMMARY OF THE INVENTION

The invention provides a device which converts an image from a first image format to a second image format in real time. A stream of image data in the first image format is processed by a horizontal filter to convert a horizontal resolution of the image to the horizontal resolution of the second image format. The horizontal filtered data is buffered by a plurality of frame buffers in a controlled timing sequence to convert a frame rate of the image to the frame rate of the second image format. The buffered data is processed by a vertical filter to convert a vertical resolution of the image to the vertical resolution of the second image format. In a preferred embodiment, data is filtered and transformed in this order, but other and further ordering of these transformation steps are within the scope and spirit of the invention.

In a preferred embodiment where the first image format is a three-color format with R, G and B components, processing is performed independently for each color of the image and the colors are encoded by an encoder circuit into the second image format. The encoder circuit may comprise elements for computing the Y, I and Q components of the NTSC image format (these components and this image format are well known in the art) or for computing the Y, U and V components of the PAL image format (this image format is well known in the art), or other image formats which may be useful for broadcast, display or recording of video images in either analog or digital form.

In a preferred embodiment, all filtering and buffering are performed digitally by devices which may have software parameters stored in memory locations. This allows an operator to configure (or reconfigure) the image converter nearly instantly by adjusting those software parameters. This also allows the image converter to perform other digital image processing functions, such as (1) zooming and panning, including resizing of the output image, (2) adjusting image sharpness and softness, and (3) flicker elimination.

In a preferred embodiment, the horizontal filter may comprise a filter circuit which interpolates among a first sequence of digital pixel values and decimates among the interpolated sequence to generate a second sequence of digital pixel values with a desired granularity. As used herein, "interpolation" and "decimation" have meanings which are well known in the art, such as explained in "Multirate Digital Signal Processing", by Ronald E. Crochiere and Lawrence R. Rabiner (Prentice-Hall 1983), hereby incorporated by reference as if fully set forth herein. For example, interpolation and decimation may comprise computing weighted averages of digital pixel values.

Two preferred embodiments are presented, which differ by the amount of processing devoted to horizontal filtering.

BRIEF DESCRIPTION OF THE DRAWINGS

FIG. 1 shows a block diagram of signal flow in an embodiment of the invention.

FIGS. 2A-2C show block diagrams of primary functional elements of an embodiment of the invention.

FIGS. 3A-3B show a block diagram of the horizontal filter module.

FIG. 5 shows a block diagram of the filter circuit.

FIG. 6 shows a block diagram of the filter cell used in the filter circuit.

FIGS. 8A-8B show block diagram of the vertical filter module.

FIGS. 17A-17B show block diagrams of the encoder module.

FIG. 19 shows a diagram of the front-panel operator controls.

DESCRIPTION OF THE PREFERRED EMBODIMENT

An embodiment of this invention may be used together with inventions which are disclosed in a prior application titled "DIGITAL VIDEO IMAGE CONVERTER", application Ser. No. 075,133, filed Jul. 20, 1987 in the name of the same inventors, now issued as U.S. Pat. No. 4,816,898, hereby incorporated by reference as if fully set forth herein.

The invention is described herein at a functional level and with functional block drawings of its major components. A single block may indicate several individual circuits which collectively perform a single function; a single line (for example, a "control line") may indicate a set of similar electrical connections or signals which collectively perform a single function or transmit a similar collection of data. From this level of description, it would be clear to one of ordinary skill in the art, after perusal of the specification, drawings and claims herein, how to make and use the invention, without undue experimentation.

FIG. 1 shows a block diagram of signal flow in an embodiment of the invention.

An image converter 101 inputs an image at a video input terminal 102 in an input image format, converts the image in real time, and outputs the image at a video output terminal 103 in an output image format. In a preferred embodiment, the input image format may comprise a high-resolution RGB format having separate red (R), green (G) and blue (B) components, such as used in computer graphics systems; this image format is well known in the art. In a preferred embodiment, the output image format may comprise a television image format such as the NTSC or PAL formats; these image formats are well known in the art.

Figure 3A:
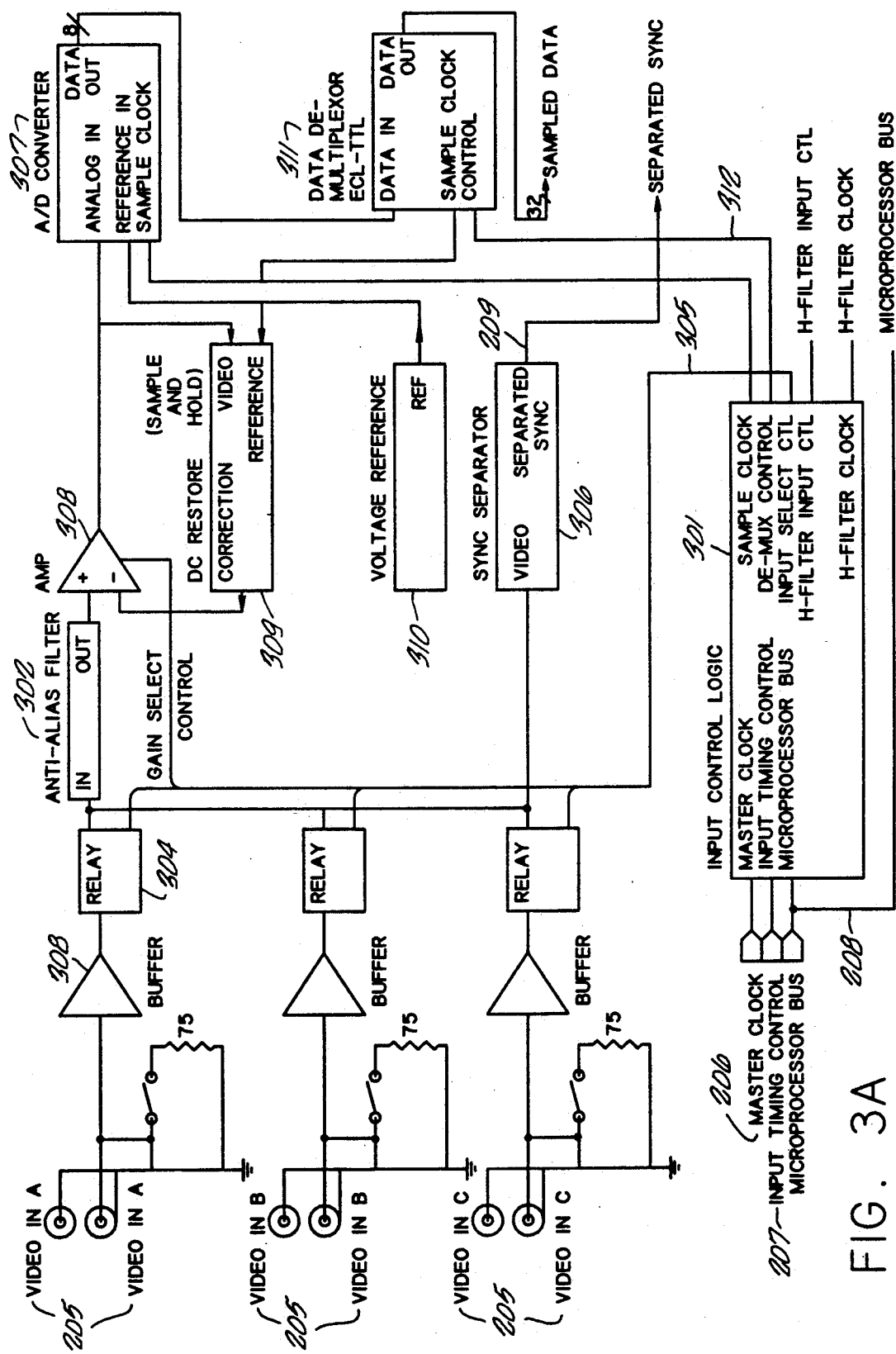

The video input terminal 102 is coupled to an input of a sampler 104, which converts a time-varying analog video input to a stream of 8-bit digital outputs at a sample rate of 125 million samples per second (see FIG. 3A). In a preferred embodiment, the sample rate remains relatively constant, but a number of samples per scan line may vary from about 1500 to about 4500 depending upon a scan-rate of the input image format.

An output of the sampler 104 is coupled to an input of a horizontal filter 105, which processes the image to convert the horizontal resolution of the image to the horizontal resolution of the second image format (see FIG. 3B). In a preferred embodiment, the horizontal resolution of the second image format may comprise 754 pixels per line for NTSC or 922 pixels per line for PAL.

Figure 8A:
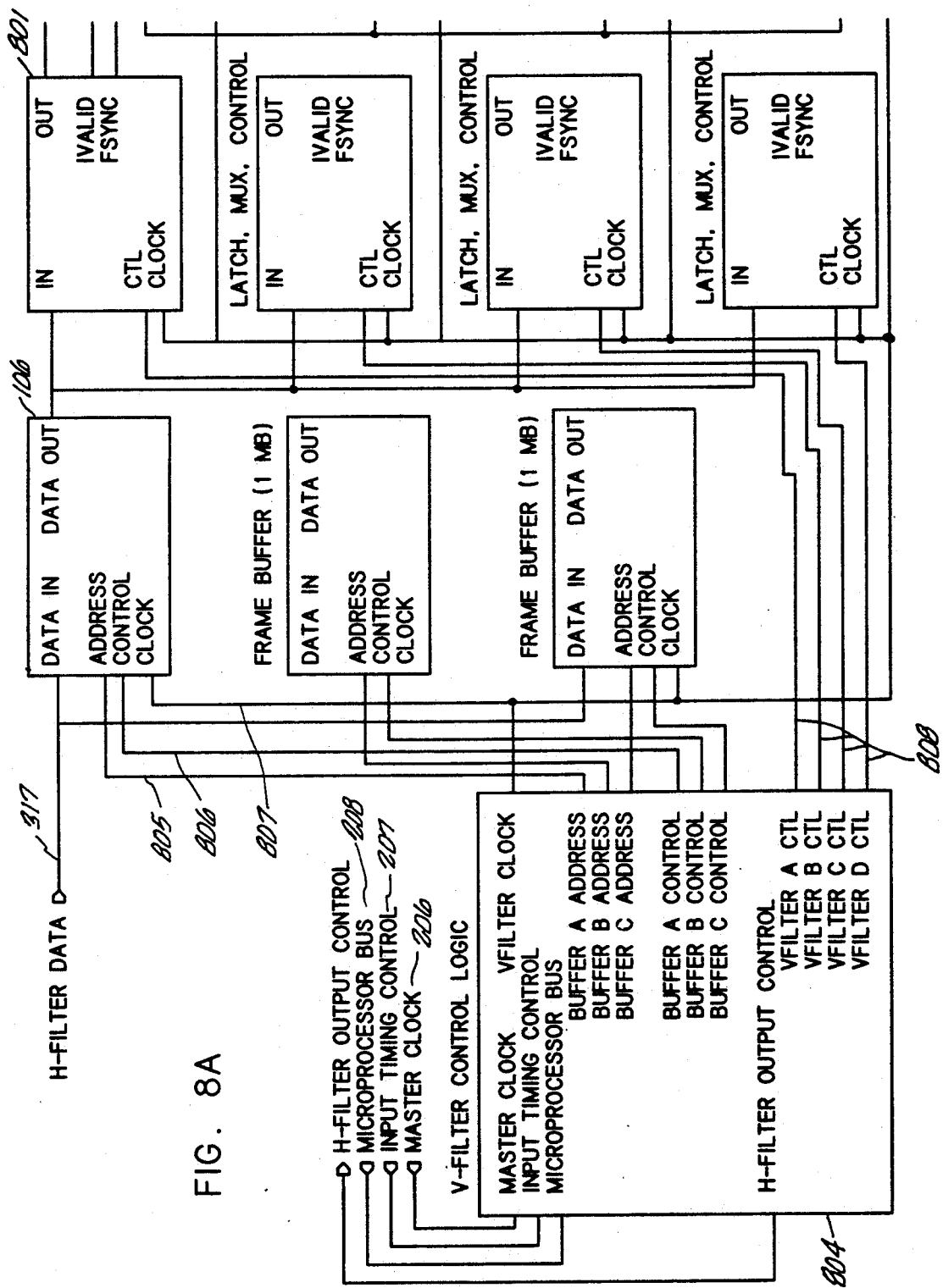

An output of the horizontal filter 105 is coupled to an input of one of a set of frame buffers 106, each of which stores the image (see FIG. 8). In a preferred embodiment, each frame buffer 106 stores a single frame of the image. However, in an alternative ("baseline") embodiment, the horizontal filter 105 generates fewer output pixels and each frame buffer 106 therefore stores information from two frames of the image, with the even lines of the first frame stored in even lines of the frame buffer 106 and the odd lines of the second frame stored in odd lines of the frame buffer 106. The baseline embodiment has fewer components and is therefore less expensive.

Each frame buffer 106 is written into in rotation with a sequence of successive input frames and read from in rotation with a sequence of successive output frames. If a frame rate of the input image format exceeds a frame rate of the output image format, at least some input frames will be overwritten and lost. On the other hand, if the frame rate of the output image format exceeds the frame rate of the input image format, at least some input frames will be duplicated.

Although a preferred embodiment converts frame rate by means of a controlled timing sequence, it would be clear to one of ordinary skill in the art, after perusal of the specification, drawings and claims herein, that frame rate could also be converted by means of a filtering step such as performed by the filter circuits 318.

An output of one of the frame buffers 106 is coupled to an input of a vertical filter 107, which processes the image to convert the vertical resolution of the image to the vertical resolution of the second image format (see FIG. 8). As used herein, the "vertical resolution" of an image format is the number of scan lines per frame of the image format. In a preferred embodiment, the vertical resolution of the second image format may comprise 484 scan lines per frame for NTSC or 574 scan lines per frame for PAL.

An output of the vertical filter 107 is coupled to an input of one of a set of field buffers 108, which collectively double-buffer a sequence of successive output fields (see FIG. 8). Double-buffering is well known in the art.

An output of the field buffers 108 is coupled to an input of an encoder 109 (see FIG. 17), which encodes a set of components of the input image format (such as the R, G and B components of the high-resolution RGB format) into a set of components of the output image format (such as the Y, I and Q components of the NTSC image format) or the Y, U and V components of the PAL image format, as well as R, G and B analog outputs. The encoder 109 may further encode these components into composite NTSC or PAL format signals.

In a preferred embodiment, the functional elements of the image converter 101 (including the horizontal filter 105, the frame buffers 106, the vertical filter 107, the field buffers 108, and the encoder 109) are controlled by a control module 110 (see FIG. 18), which may comprise a microprocessor 111 (see FIG. 18) operating under software control and having a set of digital parameters stored in memory. In a preferred embodiment, an operator of the image converter 101 may control operation of the image converter 101 by altering or interrogating one or more of the digital parameters (see FIG. 19).

Primary Functional Elements

Figure 2A:
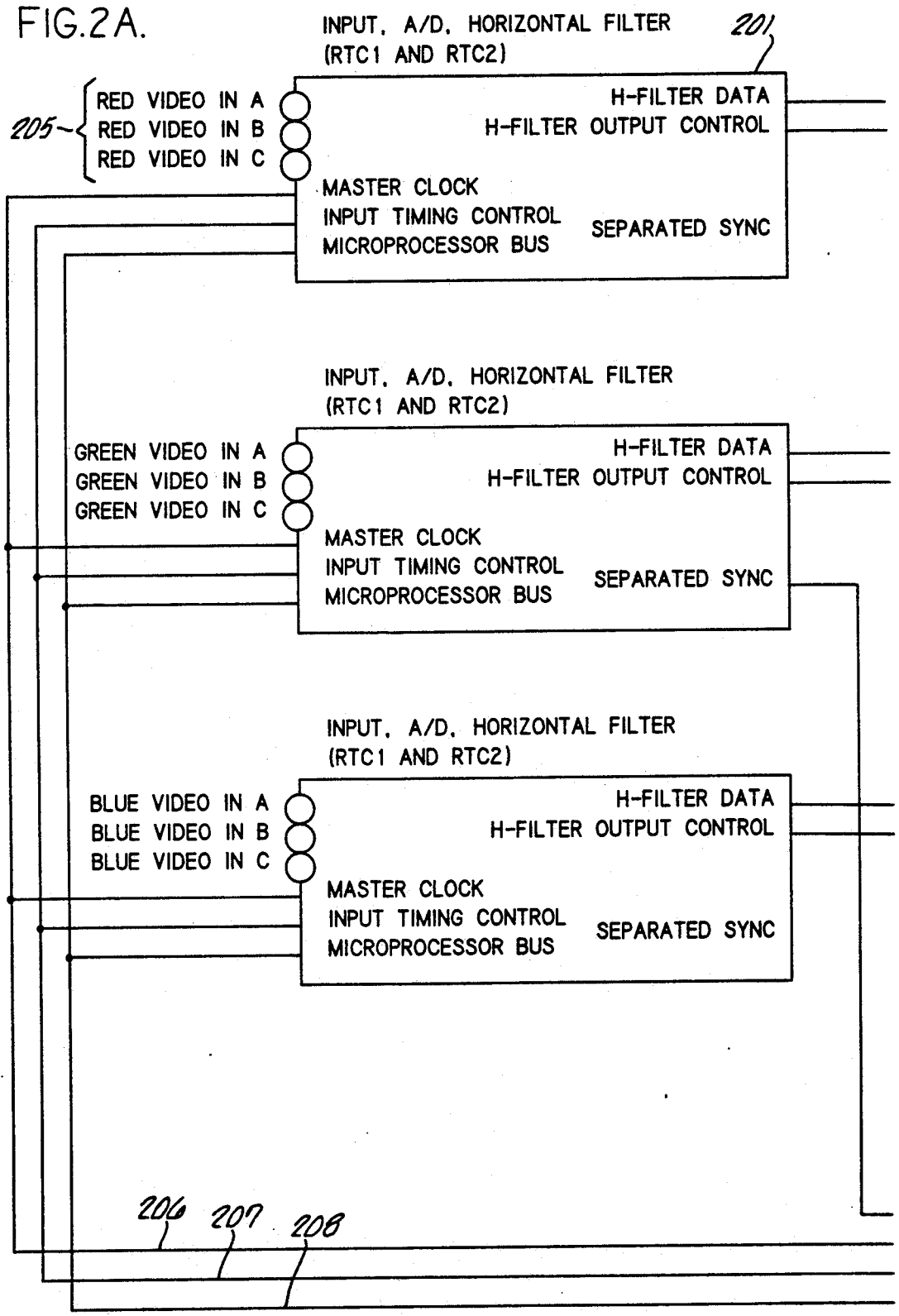
Figure 2B:
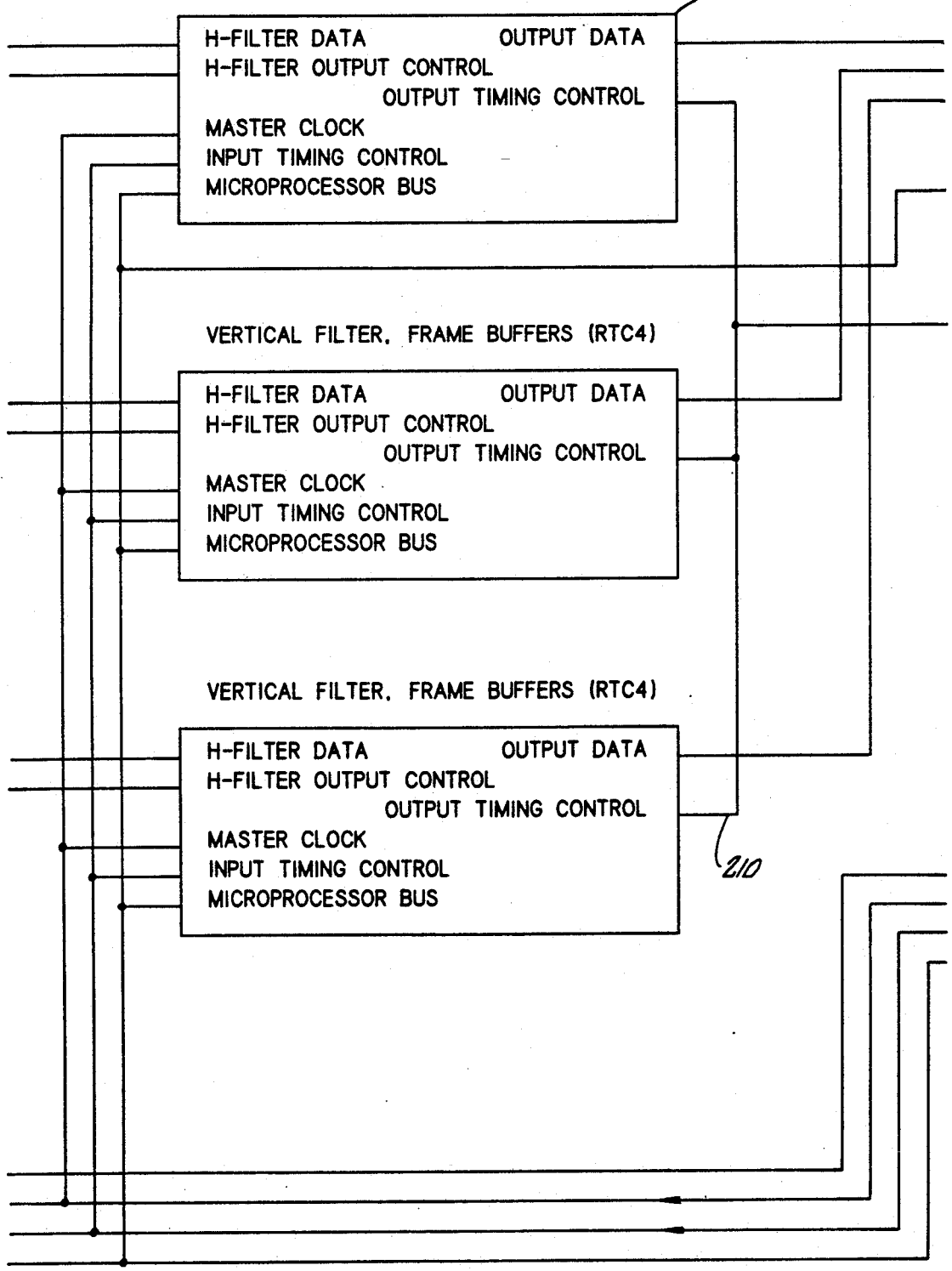

FIG. 2 shows a block diagram of primary functional elements of an embodiment of the invention.

In a preferred embodiment, the image converter 101 may comprise a plurality of horizontal filter modules 201 (see FIGS. 3A-3B), a plurality of vertical filter modules 202 (see FIG. 8), an encoder module 203 (see FIG. 17), the control module 110 (see FIG. 18), and a set of operator controls 204 (see FIG. 19).

As already disclosed herein, in a preferred embodiment, the input image format may comprise a high-resolution RGB format having separate red (R), green (G) and blue (B) components, such as used in computer graphics systems. The image converter 101 processes each color independently, by means of three of the horizontal filter modules 201 and three of the vertical filter modules 202, one for each color. The three colors are combined by the encoder module 203 after all other processing is performed.

In a preferred embodiment, each one of the three horizontal filter modules 201 has a plurality of input ports 205 A, B and C, each of which may input an image in an input image format. One of the three input ports 205 may be selected to process that particular image; this allows a preferred embodiment to be attached simultaneously to more than one input video signal. One of the input ports 205 is coupled to a horizontal filter module 201. Each of the horizontal filter modules 201 is also coupled to the control module 110 by means of a MASTER CLOCK signal line 206, an INPUT TIMING CONTROL signal line 207, and a MICROPROCESSOR BUS 208.

A first output of each of the horizontal filter modules 201 transmits horizontal filtered data to a first input of the corresponding vertical filter module 202. A second output of each of the horizontal filter modules 201 transmits control information to a second input of the corresponding vertical filter module 202. The green horizontal filter module 201 is also coupled to the control module 110 by means of a SEPARATED SYNC signal line 209.

Each of the vertical filter modules 202 is coupled to the control module 110 by means of the MASTER CLOCK signal line 206, the INPUT TIMING CONTROL signal line 207, and the MICROPROCESSOR BUS 208. An output of each of the vertical filter modules 202 is coupled to a corresponding color input of the encoder module 203. Each of the vertical filter modules 202 is also coupled to the encoder module 203 by means of an OUTPUT TIMING CONTROL signal line 210.

The encoder module 203 is coupled to the control module 110 by means of the MICROPROCESSOR BUS 208. The encoder module 203 also has a set of video output terminals, including a RED terminal 211, a GREEN terminal 212, a BLUE terminal 213, an RGB SYNC terminal 214, a BETACAM COMPONENT terminal 215, a SUPER-VHS COMPONENT terminal 216, a VIDEO OUT terminal 217, and a SUBCARRIER OUT terminal 218. The encoder module 203 also has a set of Video input terminals, including a 4VPP SYNC IN terminal 219, a COMPOSITE VIDEO IN terminal 220, and a SUBCARRIER IN terminal 221. The nature and use of these video output terminals and video input terminals in video systems is well known in the art.

The control module 110 is coupled to a set of video input terminals, including a set of HDRIVE/CSYNC IN terminals 222 A, B and C and a set of VDRIVE IN terminals 223 A, B and C. The control module 110 is also coupled to an RS-232 serial connector 224, an RS-422 serial connector 225, and an auxiliary I/O connector 226. The control module 110 is coupled to the operator controls 204 by means of a FRONT PANEL BUS signal line 227.

An operator (either a person who is physically present or a remote communication program) may give commands to the image converter 101. In a preferred embodiment, a person may use the operator controls 204, while all commands which a person may give may also be made by a remote control program (along with appropriate hardware and software support) by means of the RS-232 serial connector 224 or the RS-422 serial connector 225.

Horizontal Filter Module

FIGS. 3A-3B show a block diagram of the horizontal filter module 201.

The horizontal filter module 201 is controlled by a horizontal control block 301. It would be clear to those of ordinary skill in the art, after perusal of the specification, drawings and claims herein, that construction and operation of the horizontal control block 301 to perform the control functions disclosed herein would be a straightforward task and would not require undue experimentation. Accordingly, a more detailed description is not included herein.

Each one of the input ports 205 is coupled to an input of an anti-alias filter 302 by means of an input buffer 303 and an input relay 304. In a preferred embodiment, the input buffers 303 are capacitively coupled to remove any DC component from the input video signal. The input relays 304 are controlled by the horizontal control block 301 by means of an INPUT SELECT signal line 305. In the green horizontal filter module 201 the input relays 304 are also coupled to the SEPARATED SYNC signal line 209 by means of an input sync separator 306, which separates a composite sync signal from the input video signal, as is well known in the art.

In a preferred embodiment, the anti-alias filter 302 is of the transitional gaussian or phase-equalized type, with a cutoff frequency between about 25 MHz and about 33 MHz, a stop band which begins at the Nyquist rate of about 67.5 MHz, with an attenuation at that frequency of between about 20 db to about 46 db (46 db is preferred, but 20 db is visually acceptable and may allow improvement of other characteristics such as overshoot and phase response).

An output of the anti-alias filter 302 is coupled to an input of an A/D converter 307 by means of an input amplifier 308, which amplifies its input to about the 2-volt level, as required by the A/D converter 307. The input amplifier 308 is used in conjunction with a sample-and-hold circuit 309 and a voltage reference 310 to DC restore the input image signal. The sample-and-hold circuit 309 generates a correction voltage, which is transmitted to an inverting input of the input amplifier 308, which forces the level of a horizontal back porch to the zero level of the A/D converter 307. This structure is well known in the art. The INPUT SELECT signal line 305 is used to select one of three gain potentiometers, to make the gain of the input amplifier 308 correspond to the selected input port 205.

The A/D converter 307 runs continuously, providing an 8-bit data sample every 8 nanoseconds (nsec), as is well known in the art. A demultiplexer 311 demultiplexes this data stream into a stream of 32-bit data samples each 32 nsec; the demultiplexer 311 is controlled by the horizontal control block 301 by means of a DEMUX CONTROL signal line 312. In a preferred embodiment, the demultiplexer 311 may comprise ECL logic and may convert signal levels to TTL logic levels for downstream circuit elements, as is well known in the art.

An output of the demultiplexer 311 is coupled to a plurality of horizontal filter input FIFOs 313, horizontal filter blocks 314, and horizontal filter output FIFOs 315 by means of a SAMPLED DATA signal line 316. The horizontal filter blocks 314 convert each horizontal line of the image from a number of pixels in the input image format to a number of pixels in the output image format (see FIG. 3B). Horizontal filtered data is coupled from the horizontal filter output FIFOs 315 to the vertical filter module 202 by means of a HORIZONTAL FILTERED DATA signal line 317.

Each horizontal filter block 314 comprises a pair of filter circuits 318 (see FIG. 5). However, in an alternative (baseline) embodiment, each horizontal filter block 314 comprises one filter circuit 318. As disclosed herein, the use of two filter circuits 318 allows more input pixels to be examined when producing an output pixel. It would be clear to one of ordinary skill in the art, after perusal of the specification, drawings and claims herein, that each horizontal filter block 314 could comprise three, or some other number, of filter circuits 318 as well.

The horizontal filter blocks 314 can only process data at about one sixth of the rate the A/D converter 307 can generate it. Thus, in a preferred embodiment, six sets of the horizontal filter input FIFOs 313, the horizontal filter blocks 314, and the horizontal filter output FIFO 315 are used; each set is called a "horizontal filter section". In an alternative (baseline) embodiment, only three horizontal filter sections are used. In embodiments with only three horizontal filter sections, only every other input horizontal line is processed, and two consecutive input frames are thus required to capture an entire image.

In a preferred embodiment, each horizontal filter input FIFO 313 may comprise four NEC uPD41102C FIFO circuits, loaded in parallel from the 32-bit sampled data from the SAMPLED DATA signal line 316 with a full input horizontal line of data. The horizontal filter input FIFOs 313 may collectively hold about 4500 samples, enough for about 36.32 microseconds (usec) of active horizontal line time. However, because each horizontal input FIFO 313 begins emptying its data to the corresponding horizontal filter block 314 as soon as they are loaded with the first data of a new scan line, up to about 42 usec of active horizontal line time can be processed. The horizontal filter input FIFOs 313 are unloaded sequentially for processing by the horizontal filter blocks 314 (see FIG. 5).

In a preferred embodiment, each horizontal filter output FIFO 315 may comprise two NEC uPD41102C FIFO circuits. Each such circuit may hold one processed horizontal line and may be used alternately, one for input from one of the horizontal filter blocks 314 and one for output to the vertical filter module 202 by means of the HORIZONTAL FILTERED DATA signal line 317.

Horizontal Filter Data Flow

Figure 4A:
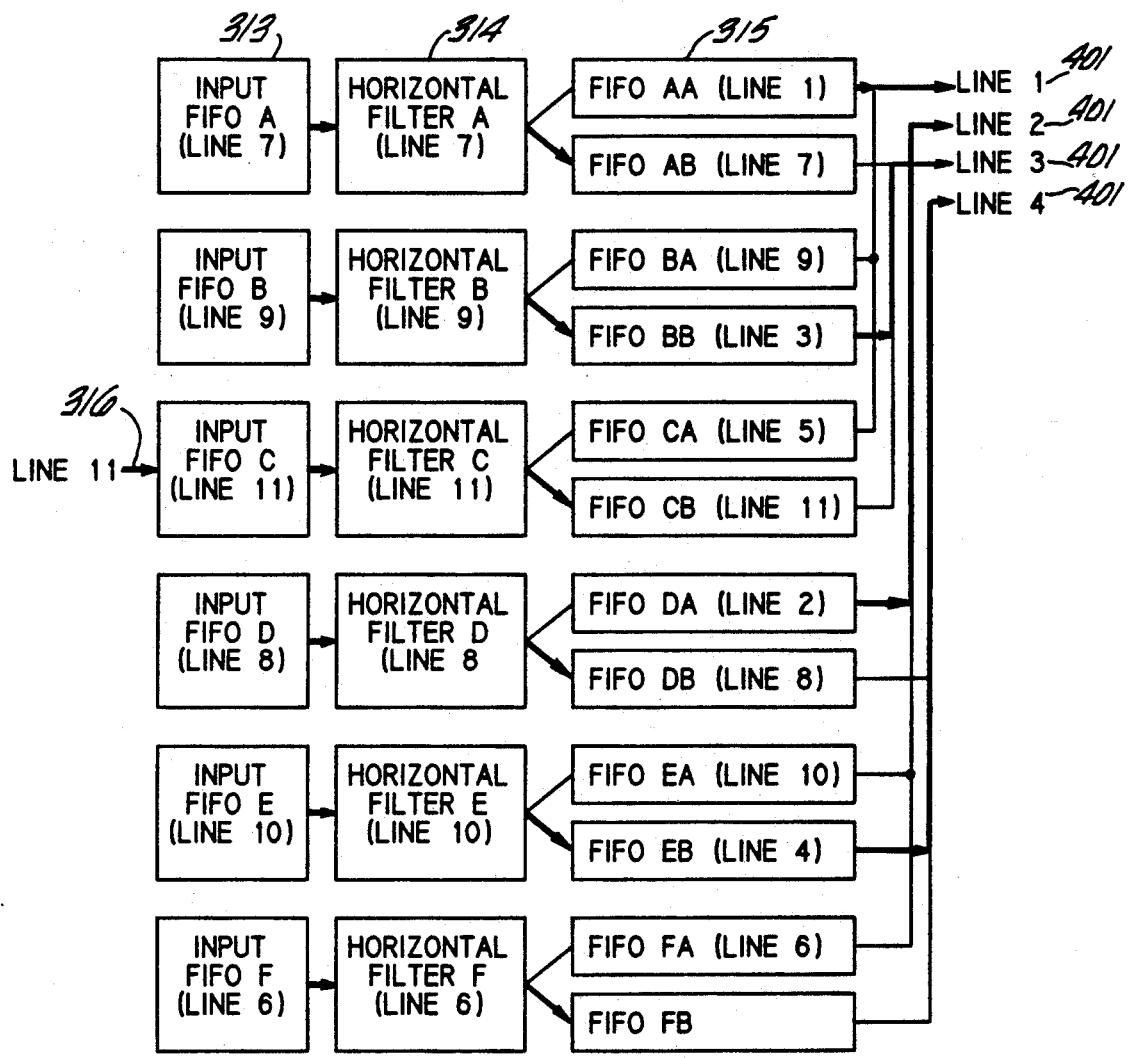
FIG. 4A shows a block diagram of data flow in the horizontal filter module of a preferred embodiment of the invention.

FIG. 4A shows a block diagram of data flow in the horizontal filter module 201 of a preferred embodiment of the invention.

Data enters the horizontal filter module 201 one scan line at a time. A set of four horizontal pixels in a scan line is input every clock cycle. Data exits the horizontal filter module 201 four scan lines at a time. A set of four pixels in a vertical column is output every clock cycle. Horizontal filtering is performed by means of six horizontal filter input FIFOs 313, six horizontal filter blocks 314, and twelve horizontal filter output FIFOs 315.

The 32-bit input data from the SAMPLED DATA signal line 316 is loaded into the six horizontal filter input FIFOs 313 A, B, C, D, E and F in a round-robin manner, in the order A (line 1)—D (line 2)—B (line 3)—E (line 4)—C (line 5)—F (line 6). Each horizontal filter input FIFO 313 transfers its data to the corresponding horizontal filter block 314. Each horizontal filter block 314 operates on its data in parallel and stores its output in one of two corresponding horizontal filter output FIFOs 315 (each). Each horizontal filter output FIFO 315 transfers its data to a quarter 401 of the HORIZONTAL FILTERED DATA signal line 31 to which it is assigned.

Each horizontal filter block 314 has two corresponding horizontal filter output FIFOs 315; at any time one inputs data from the horizontal filter block 314 and one outputs data to the quarter 401 of the HORIZONTAL FILTERED DATA signal line 317 to which it is assigned. So that the HORIZONTAL FILTERED DATA signal line 317 may output four pixels at once, the horizontal filter output FIFOs 315 are loaded (in parallel) in the order AA (line 1)—DA (line 2)—BB (line 3)—EB (line 4)—CA (line 5)—FA (line 6)—AB (line 7)—DB (line 8)—BA (line 9)—EA (line 10)—CB (line 11)—FB (line 12). Each quarter 401 of the HORIZONTAL FILTERED DATA signal line 317 transfers an 8-bit data value, so the HORIZONTAL FIL- TERED DATA signal line 317 comprises a 32-bit data value.

Figure 4B:
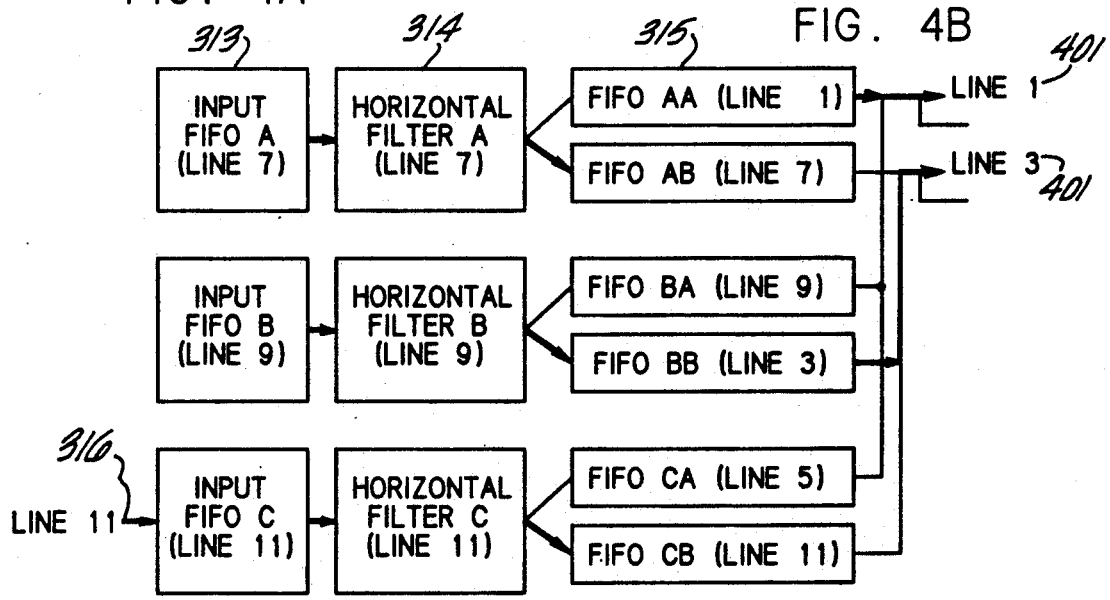
FIG. 4B shows a block diagram of data flow in the horizontal filter module of an alternative (baseline) embodiment of the invention.

FIG. 4B shows a block diagram of data flow in the horizontal filter module 201 of an alternative (baseline) embodiment of the invention.

Horizontal filtering is performed by means of only three horizontal filter input FIFOs 313, three horizontal filter blocks 314, and six horizontal filter output FIFOs 315. In the baseline embodiment, two frames must be processed to produce a complete set of data on the HORIZONTAL FILTERED DATA signal line 317. In the first of two frames, odd scan lines are processed; in the second of two frames, even scan lines are processed In the first of two frames, input data from the SAMPLED DATA signal line 316 is loaded into the three horizontal filter input FIFOs 313 A, B and C in like manner, in the order A (line 1)—B (line 3)—C (line 5). The horizontal filter output FIFOs 315 are loaded in like manner in the order AA (line 1)—BB (line 3)—CA (line 5)—AB (line 7)—BA (line 9)—CB (line 11). Each horizontal filter output FIFO 315 transfers its data to the quarter 401 of the HORIZONTAL FILTERED DATA signal line 317 to which it is assigned, so two quarters 401 of the HORIZONTAL FILTERED DATA signal line 317 transfer data at once (lines 1 and 3).

In the second of two frames, input data from the SAMPLED DATA signal line 316 is loaded into the three horizontal filter input FIFOs 313 A, B and C in like manner, in the order A (line 2)—B (line 4)—C (line 6). The horizontal filter output FIFOs 315 are loaded in like manner in the order AA (line 2)—BB (line 4)—CA (line 6)—AB (line 8)—BA (line 10)—CB (line 12). Each horizontal filter output FIFO 315 transfers its data to the quarter 401 of the HORIZONTAL FILTERED DATA signal line 317 to which it is assigned, so two quarters 401 of the HORIZONTAL FILTERED DATA signal line 317 transfer data at once (lines 2 and 4).

Filter Circuit

FIG. 5 shows a block diagram of the filter circuit 318.

A filter data input 501 for each one of a set of four filter cells 502 is coupled to the input data from the corresponding horizontal filter input FIFOs 313 by means of a filter input latch 503. Each of the four filter cells 502 has a RAM address input which is coupled to an output of a RAM address counter 504. An output of each one of the four filter cells 502 is coupled to a round-and-clip circuit 505 by means of a filter selector 506. An output of the round-and-clip circuit 505 is coupled to the corresponding horizontal filter output FIFO 315 by means of a latch and tristate buffer circuit 507.

An output of the RAM address counter 504 is also coupled to an address input of a control RAM 508. An output of the control RAM 508 is coupled to an input of a control decoder 509. An output of the control decoder is coupled to a preset control input of the RAM address counter 504 (used to reset the RAM address counter 504 to a predetermined value), a control input of the filter selector 506, a control input of the latch and tristate buffer circuit 507, and a CDAT39 signal line 510 (which may also signal that data is ready from either of two filter circuits 318 that are coupled in parallel).

In one horizontal filter block 314, two filter circuits 318 are coupled in parallel, in such manner that there are eight filter cells 502 operating in parallel to perform the filtering operation. This is accomplished by coupling the filter data inputs 501 of the two filter circuits 318, coupling the outputs of the latch and tristate buffer circuits 507 of the two filter circuits 318, and programming the control RAM 508 in each of the two filter circuits 318 to use the latch and tristate buffer circuit 507 in such manner to allow passage of output data from one of the two filter circuits 318 at a time.

FIG. 6 shows a block diagram of the filter cell 502 used in the filter circuit 318.

The filter data input 501 of the filter cell 502 is coupled to a first input of a filter multiplier 601. The RAM address input of the filter cell 502 is coupled to an address input of a filter cell RAM 602. An output of the filter cell RAM 602 is coupled to a second input of the filter multiplier 601. An output of the filter multiplier 601 is coupled to an input of a filter accumulator 603 by means of an accumulator latch 604. An output of the filter accumulator 603 is coupled to output data to the filter selector 506.

The filter circuit 318 performs an integer-ratio conversion in real time. An input stream of 8-bit data samples at an input sample rate is converted to an output stream of 8-bit data samples at an output sample rate. Coefficient values for the filter circuit 318 are stored in the filter cell RAM 602; these values may be written by the microprocessor 111 to reprogram the filter for a different conversion rate.

The microprocessor 111 may load the control RAM 508 and the filter cell RAM 602 by means of the MICROPROCESSOR BUS 208.

Filter Circuit Data

Figure 7A:
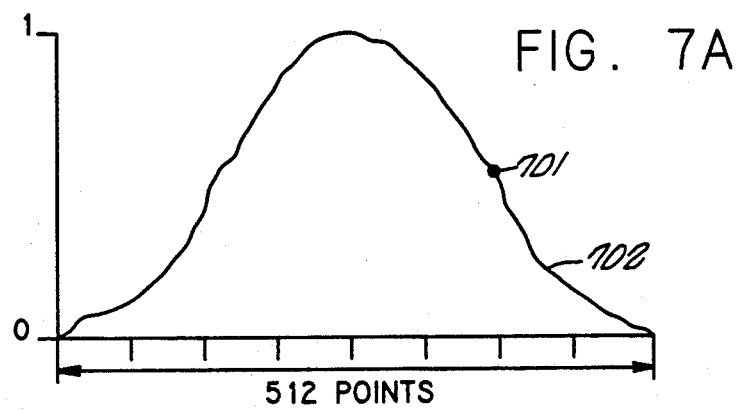
FIGS. 7A-7B show the coefficients for the filter circuit.
Figure 7B:
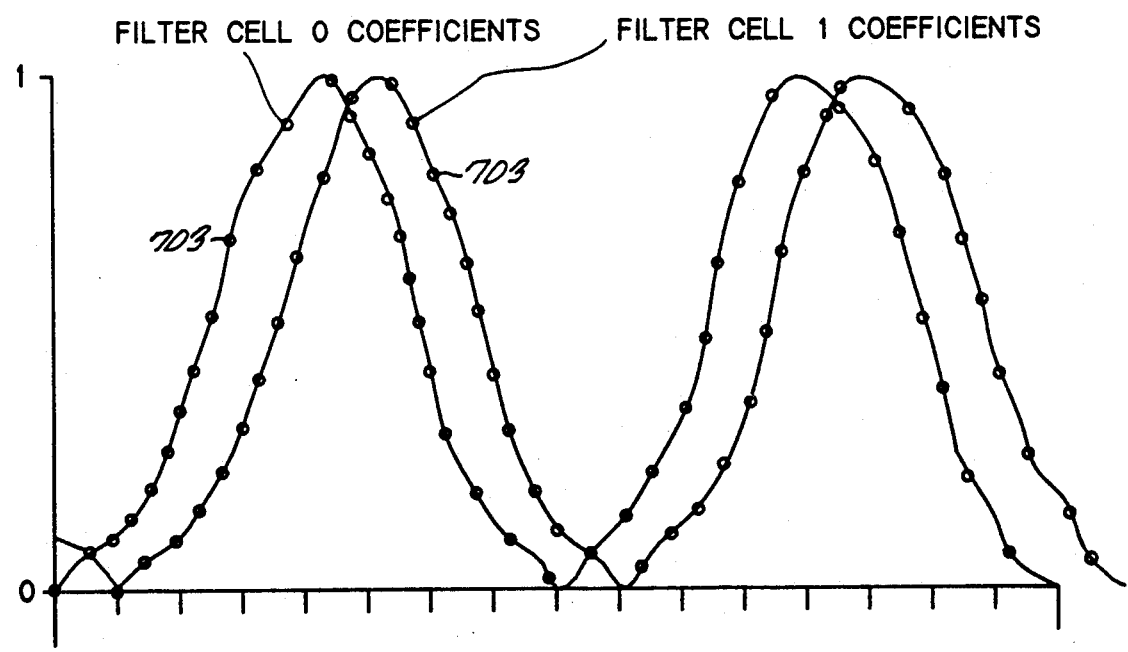

FIGS. 7A-7B show the coefficients 701 for the filter circuit 318.

In a preferred embodiment, the filter circuit 318 is configured to perform interpolation and decimation in a 64:n conversion. Interpolation is performed by calculating the data value of an output pixel. Decimation is performed by only calculating those output pixels which are ultimately desired. A 64:n ratio may be used for any conversion ratio by appropriate selection of a value for n. For example, when converting from a graphics workstation format to NTSC, n may be set to 39.

Each memory location in the filter cell RAM 602 stores a coefficient 701 for use by the set of filter multipliers 601. Collectively, the coefficients 701 define the interpolation function by which the filter cells 502 calculate their outputs. The number of filter cells 502 required is the width of the interpolation function in output samples (i.e., the number of output pixels which are generated as an impulse response). In a preferred embodiment, the function will be 4 or 8 output samples wide and will therefore require 4 or 8 filter cells 502.

The number of coefficients 701 required, and thus the minimum length of the filter cell RAM 602, is the product of the width of the interpolation function and the numerator of the conversion ratio. With a conversion ratio of 64:n, the numerator is 64 and the filter cell RAM 602 must therefore require 256 or 512 coefficients. In a preferred embodiment, the filter cell RAM 602 has 512 memory locations; a narrower interpolation function may be computed by setting some of the coefficients to zero, or by using only part of the filter cell RAM 602 and the control RAM 508.

An interpolation function 702 is shown which is 8 output samples wide and has a conversion ratio of 64:n;

it therefore requires 512 coefficients 701, the full length of a filter cell RAM 602. To compute this interpolation function 702, each filter cell RAM 602 is loaded with a set of memory coefficient values 703.

The set of memory coefficient values 703 is shown for each of two filter cells 502 A and B (out of a total of eight filter cells 502). First, filter cell 502 A's filter cell RAM 602 is loaded with every n'th coefficient 701. When the end of the interpolation function 702 is reached, the filter cell 502 A will have completed one output pixel. The next coefficient 701 is taken from a repeat copy of the interpolation function 702. This process of selecting coefficients 701 is repeated until all 512 memory locations in filter cell 502 A's filter cell RAM 602 are loaded, at which point the next coefficient 701 is guaranteed to be same as the first.

The filter cell RAM 602 memory values for filter cell 502 A may be expressed with the following equations:

Let "p/q" be the conversion ratio and let "w" be the width of the interpolation function 702.

$$p := 64 \quad (704)$$
$$q := 39 \quad (705)$$
$$w := 8 \quad (706)$$

Let "i" be an index of the coefficients 701 for the interpolation function 702.

$$i := 0..(w*p) \quad (707)$$

Let "if [i]" be the set of coefficients 701 for the interpolation function 702.

Let "j" be an index of the memory coefficient values 703 for the filter cell RAM 602.

$$j := 0..(w*p) \quad (808)$$

Let "ml [j]" be the set of memory coefficient values 703 for the filter cell RAM 602. Let "mod (a,b)" be the remainder of a modulus b.

$$ml\ [j] := if\ [mod\ (j*q,\ w*p)] \quad (709)$$

The set of memory coefficient values 703 for filter cell 502 B is generated in the same manner, except that the coefficients 701 of the interpolation function 702 are shifted by 64 (one output sample width). The memory coefficient values 703 for the remaining six filter cells 502 are also generated in the same manner, except that the coefficients 701 of the interpolation function 702 are shifted by one output sample width for each succeeding filter cell 502.

Let "ml [j,k]" be the set of memory coefficient values 703 for the k'th filter cell RAM 602.

$$ml\ [j,k] := if\ [mod\ (j*q+k*p,\ w*p)] \quad (710)$$

The interpolation function 702 is selected from a family of functions which have been found by the inventors to be well-suited to interpolation and decimation by the filter circuits 318.

Let "ir (t)" be the preferred interpolation function 702.

$$gauss\ (t) := exp\ (-t\ 2) \quad (711)$$
$$sinx\ (t) := sin\ (pi*t)/(pi*t) \quad (712)$$
$$ir\ (t) := sinx\ (c1*t) * gauss\ (c2*t) \quad (713)$$

The memory coefficient values 703 of the preferred interpolation function 702 are:

$$if\ [i] := ir\ (w/2 - ((i+.5)/p) \quad (714)$$

or (more specifically):

$$if\ [i] := ir\ ((256/64) - ((i+0.5)/64)) \quad (715)$$

In a preferred embodiment, c1 and c2 may be set to vary the sharpness or softness of the image (c1) and to minimize any ripples in the frequency response of the interpolation function (c2). The following table shows preferred values for c1 and c2:

| c1 | c2 | image type | (716) |
|----|----|------------|-------|
| .5 | .35 | soft | |
| .7 | .35 | medium | |
| .9 | .38 | sharp | |

The interpolation function 702 may be selected from the preferred family of functions by the microprocessor 111 based on parameters which are selected by an operator. For example, the operator may select the sharpness or softness of the image, or the operator may select the conversion ratio.

Once the coefficients 701 are selected, they must be normalized such that the gain of the filter circuit 318 is unity, as would be clear to one of ordinary skill in the art, after perusal of the specification, drawings and claims herein.

It would also be clear to one of ordinary skill in the art, after perusal of the specification, drawings and claims herein, that modification of a standard microprocessor system to calculate the coefficients 701 of the interpolation function 702 from parameters selected by the operator would be a straightforward task and would not require undue experimentation.

Vertical Filter Module

FIG. 8 shows a block diagram of the vertical filter module 202.

In a preferred embodiment, the vertical filter module 202 may comprise the frame buffers 106, a plurality of vertical filter input latches 801, vertical filter circuits 802 and vertical filter output FIFOs 803, and the field buffers 108. In a preferred embodiment, there are four sets of vertical filter input latches 801, vertical filter circuits 802 and vertical filter output FIFOs 803; each set is called a "vertical filter section".

The vertical filter module 202 is controlled by a vertical control block 804. It would be clear to those of ordinary skill in the art, after perusal of the specification, drawings and claims herein, that construction and operation of the vertical control block 804 to perform the control functions disclosed herein would be a straightforward task and would not require undue experimentation. Accordingly, a more detailed description is not included herein.

A data input of the frame buffers 106 is coupled to an output of the horizontal filter module 201 by means of the HORIZONTAL FILTERED DATA signal line 317. The frame buffers 106 are controlled by the vertical control block 804 by means of a set of ADDRESS signal lines 805 (one per frame buffer 106), a set of CONTROL signal lines 806 (one per frame buffer 106), and a CLOCK signal line 807.

An output of the frame buffers 106 is coupled to a data input of the vertical filter input latches 801. The vertical filter input latches 801 are controlled by the vertical control block 804 by means of the CLOCK signal line 807 and a VFILTER CTL signal line 808. A data output of each one of the vertical filter input latches 801 is coupled to a data input of the corresponding vertical filter circuit 802. The first vertical filter input latch 801 also has an INVALID output and an FSYNC output coupled to a pair of corresponding inputs of the first vertical filter circuit 802.

The vertical filter circuits 802 are controlled by the vertical control block 804 by means of the CLOCK signal line 807. The vertical filter circuits 802 are also coupled to the MICROPROCESSOR BUS 208. A data output of each of the vertical filter circuits 802 is coupled to a data input of the corresponding vertical filter output FIFO 803. An OVALID L output of each of the vertical filter circuits 802 is coupled to an IN CTL input of the corresponding vertical filter output FIFO 803.

A data output of each of the vertical filter output FIFOs 803 is coupled to a corresponding input of the field buffers 108. The field buffers 108 are controlled by the vertical control block 804 by means of the CLOCK signal line 807. An input of the field buffers 108 is also coupled to an OUTPUT TIMING CONTROL signal line 809. A control output of the field buffers 108 is coupled to an OUT CTL input of each of the vertical filter output FIFOs 803. A data output of the field buffers 108 is coupled to the encoder module 203 by means of an OUTPUT DATA signal line 810.

Vertical Filter Data Flow

An important feature of the frame buffers 106 is their ability to read data quickly in vertical columns and to write data quickly in horizontal rows. This is accomplished by the use of static-column dynamic memories (DRAMs). With static-column DRAMs, as is well known in the art, once the row address has been latched by asserting RAS L, and CAS L has been asserted, the column address may be changed as needed to access any location within the row without further clocking of the chip. In a preferred embodiment, the particular static-column DRAMs which are used also have a "hidden refresh" feature (the "hidden refresh" feature is well known in the art).

Data is transferred out of the frame buffers 106 and into the vertical filter input latches 801 as a vertical column of four pixels (a "frame buffer cluster"). The frame buffer cluster is sequenced by the vertical filter input latches 801 to the vertical filter circuits 802. The vertical filter circuits 802 filter the data in like manner as the horizontal filter blocks 314 (except that only one filter circuit 318 is used, not two as in the horizontal filter blocks 314). The vertical filter circuits 802 transmit entire columns of data to the vertical filter output FIFOs 803, which transmit entire columns of data to the field buffer 108, which transmits scan lines to the encoder 109.

Figure 9:
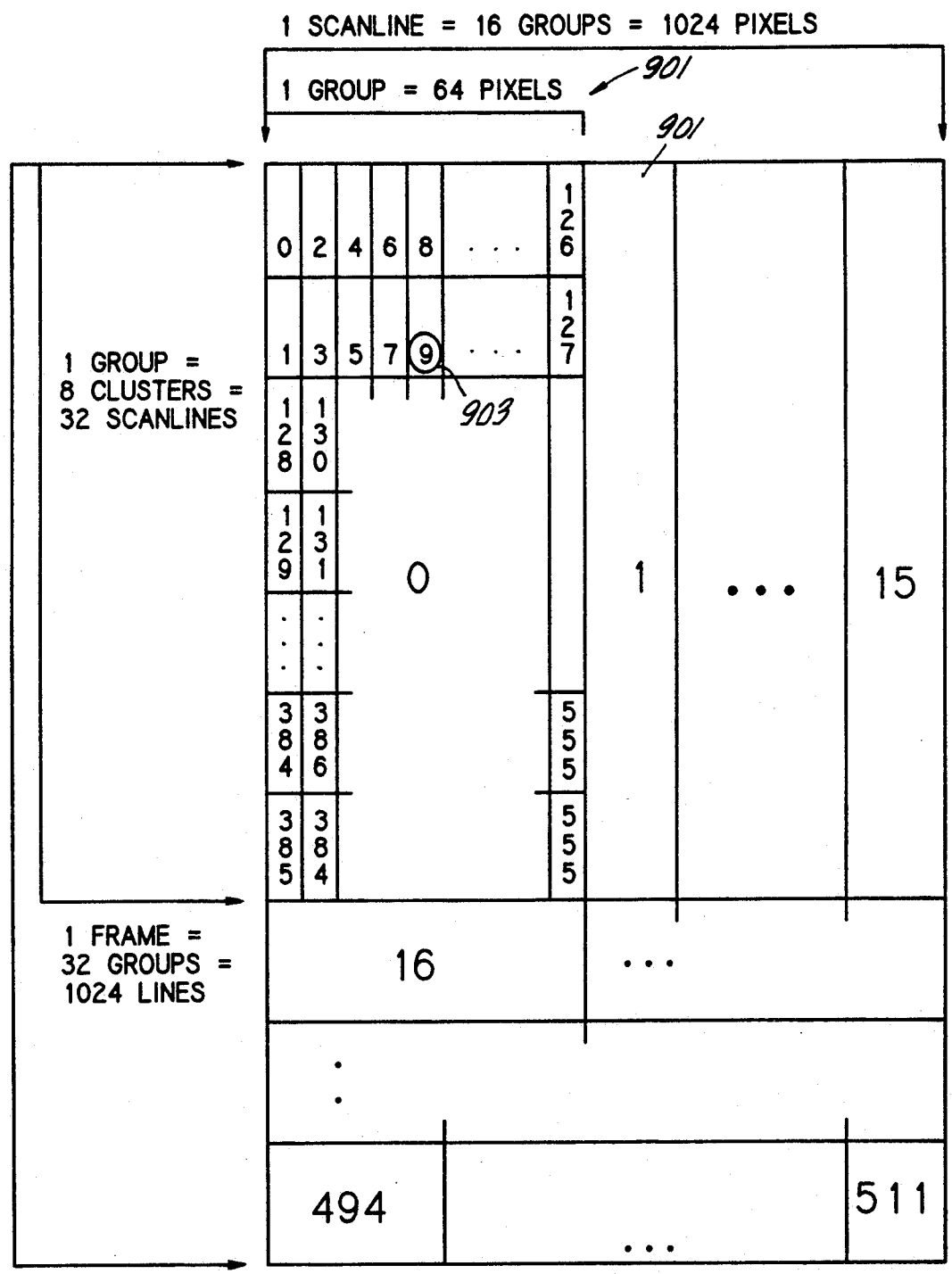
FIG. 9 shows the address organization of the frame buffer memory.

FIG. 9 shows the address organization of the frame buffer 106 memory.

In a preferred embodiment, the image data is divided into 512 rectangular frame buffer groups 901, each corresponding to a frame buffer row address 902 (see FIG. 10) for the frame buffer 106 memory. Each rectangular frame buffer group 901 is further divided into 512 frame buffer locations 903, each corresponding to a frame buffer column address 904 (see FIG. 10) for the frame buffer 106 memory. Each frame buffer location 903 stores a single frame buffer cluster. This allows both horizontal and vertical memory accesses to access a large number of frame buffer locations 903 before the overhead of a new RAS memory cycle is needed. Thus, the frame buffer 106 can both read and write at speeds close to one word per clock cycle.

In a preferred embodiment, the frame buffer 106 memory capacity may be 1024 × 1024 pixels, but not all of this capacity must be used. For example, horizontally, only 754 pixels are used for NTSC and 922 pixels are used for PAL. Vertically, as many scan lines of memory are used as there are active scan lines in the input video image, to a maximum of 1024.

A frame buffer read address generator 905 (which may comprise an independent state machine) controls the frame buffer 106 read addresses; in like manner, a frame buffer write address generator 906 (which may comprise an independent state machine) controls the frame buffer 106 write addresses. In a preferred embodiment, an frame buffer idle control 907 (which may comprise a third independent state machine) provides control lines which maintain refresh in the idle frame buffer 106.

Both the frame buffer read address generator 905 and the frame buffer write address generator 906 enter an idle state between frames, in which they produce control signals which are identical to, and synchronous with, the frame buffer idle control 907. This allows a frame buffer 106 to be switched between an address generator in an idle state (either the frame buffer read address generator 905 or the frame buffer write address generator 906) and the frame buffer idle control 907, asynchronously by the microprocessor 111.

The frame buffer write address generator 906 has two modes of operation (interlaced and non-interlaced), depending on whether the input video is interlaced. In each case, a frame buffer horizontal count 908 and a frame buffer vertical count 909 are combined to produce the frame buffer column address 904 and the frame buffer row address 902 for the frame buffer 106 memory.

Figure 10:
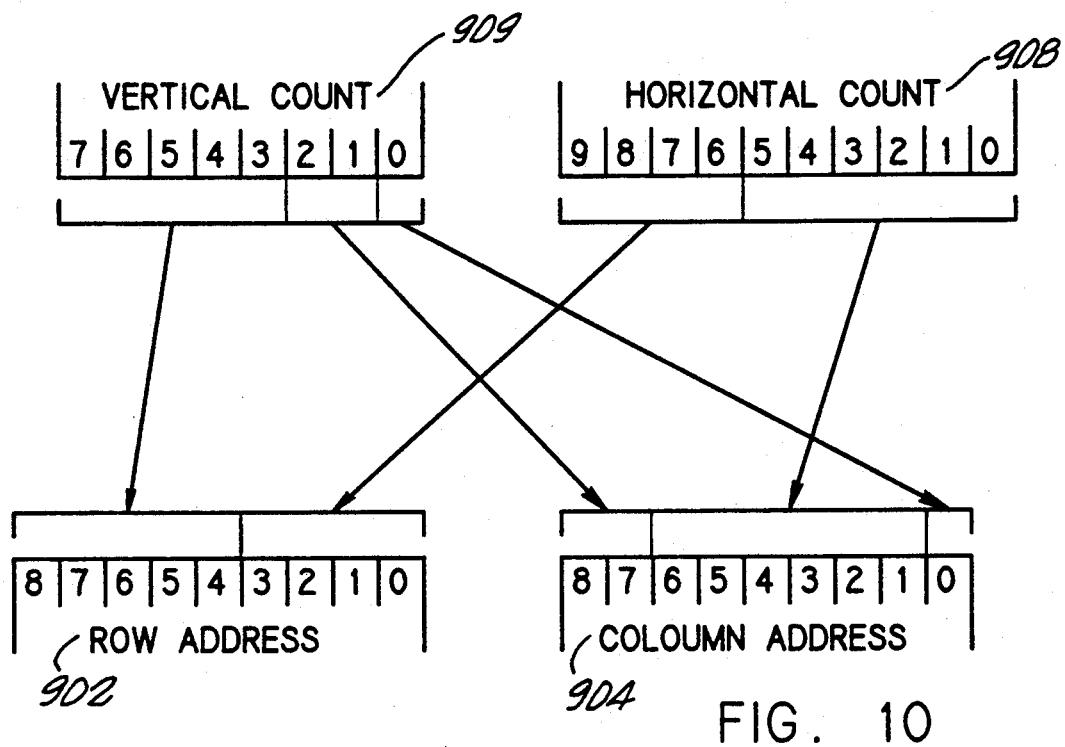
FIG. 10 shows a non-interlaced frame buffer write address generator schema.

FIG. 10 shows a non-interlaced frame buffer write address generator 906 schema.

The following table shows the bit mapping in a non-interlaced mode:

| FROM BITS | → TO BITS | (1001) |
|---|---|---|
| bits 0–5, horizontal count | bits 1–6, column address | |
| bits 6–9, horizontal count | bits 0–3, row address | |
| bit 0, vertical count | bit 0, column address | |
| bits 1–2, vertical count | bits 7–8, column address | |
| bits 3–7, vertical count | bits 4–8, row address | |

The frame buffer horizontal count 908 is incremented once for each frame buffer cluster written to the frame buffer 106. Every 64 frame buffer clusters, bit six of the frame buffer horizontal count 908 changes, causing the frame buffer row address 902 to change, requiring a new RAS cycle. When the last pixel of a row is written (as determined by a programmable limit), the frame buffer horizontal count 908 is cleared and the frame buffer vertical count 909 is incremented. The frame buffer write address generator 906 then enters the idle state until the horizontal filter module 201 indicates that more data is available.

A hidden refresh cycle is added to every fourth new RAS cycle. The frame buffer write address generator 906 is reset every input field, at which point both the frame buffer horizontal count 908 and the frame buffer vertical count 909 are cleared.

Figure 11:
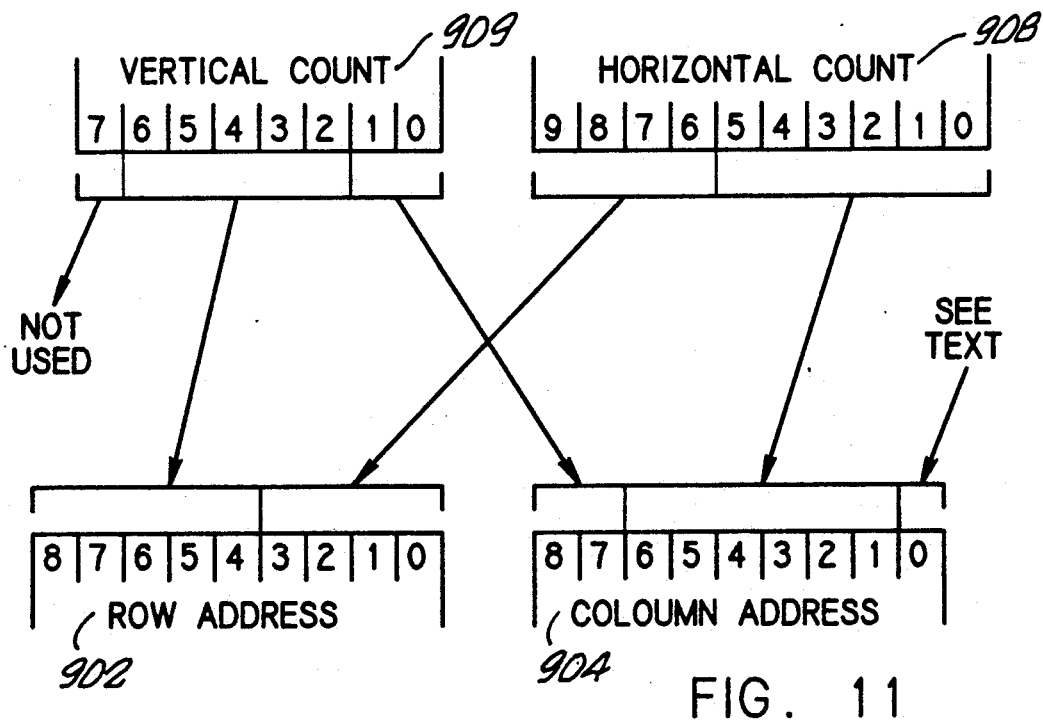
FIG. 11 shows an interlaced frame buffer write address generator schema.

FIG. 11 shows an interlaced frame buffer write address generator 906 schema.

The following table shows the bit mapping in an interlaced mode:

| FROM BITS | → TO BITS | (1101) |
|---|---|---|
| bits 0-5, horizontal count | bits 1-6, column address | |
| bits 6-9, horizontal count | bits 0-3, row address | |
| bits 0-1, vertical count | bits 7-8, column address | |
| bits 2-6, vertical count | bits 4-8, row address | |
| bit 7, vertical count | not used | |

Bit 0 of the frame buffer column address 904 is described in more detail with reference to FIG. 12.

Figure 12:
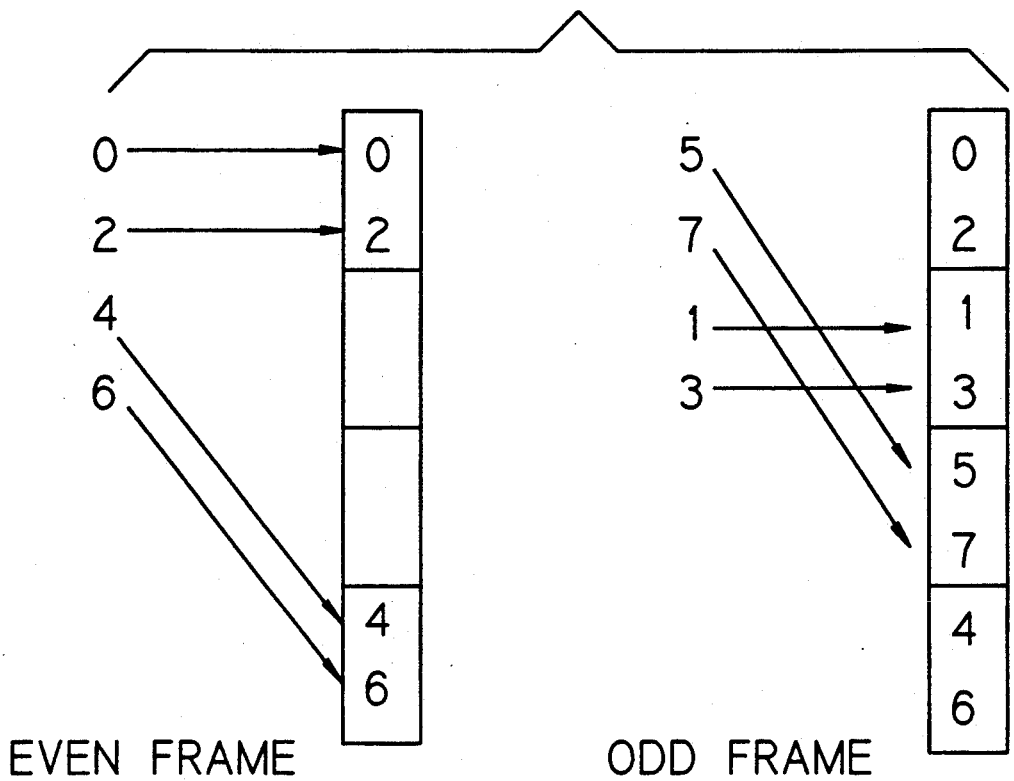
FIG. 12 shows an interlaced frame buffer write address generator schema for bit 0 of the frame buffer column address.

FIG. 12 shows an interlaced frame buffer write address generator 906 schema for bit 0 of the frame buffer column address 904.

In the interlaced mode, the frame buffer cluster received from the horizontal filter module 201 will be either four even lines (i.e, lines 0, 2, 4 and 6) or four odd lines (i.e., lines 1, 3, 5 and 7). To write these lines as two separate frame buffer clusters of pixels, the frame buffer 106 memory is separated into two halves, and bit 0 of the frame buffer column address 904 is generated separately for each half. For the half which is to receive scan lines 0 and 2, this bit 0 is held at "0", while for the half which is to receive scan lines 4 and 6, this bit 0 is held at "1". The bit 0 is then complemented for every other input field, in both places.

Figure 13:
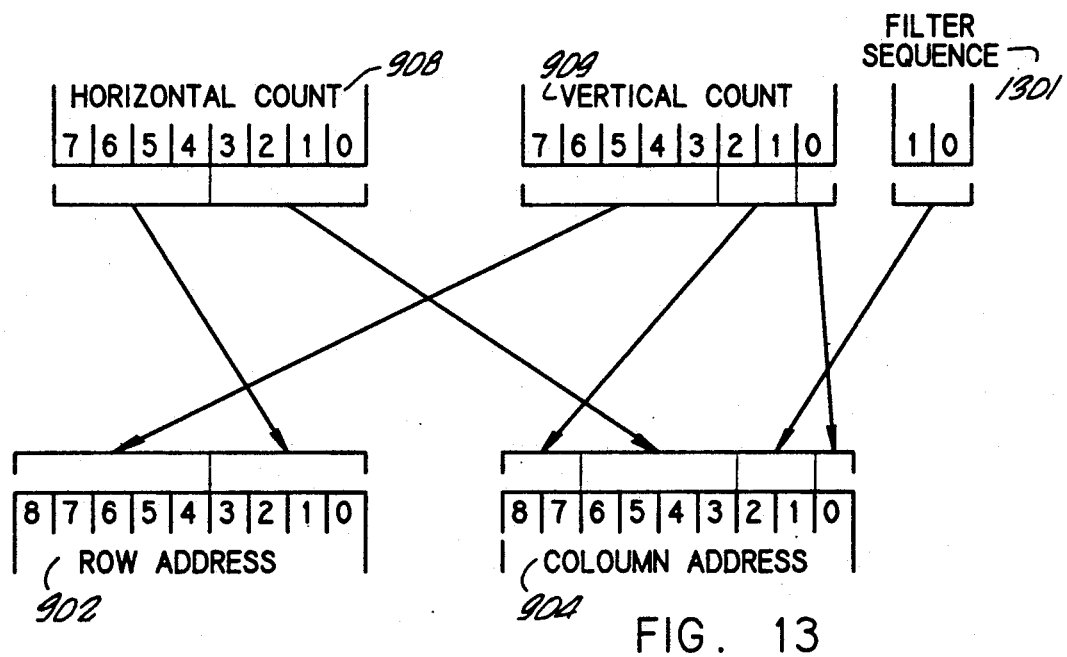
FIG. 13 shows a frame buffer read address generator schema.

FIG. 13 shows a frame buffer read address generator 905 schema.

A filter sequence 1301 is combined with the frame buffer horizontal count 908 and the frame buffer vertical count 909 to produce the frame buffer column address 904 and the frame buffer row address 902 for the frame buffer 106 memory. The following table shows the bit mapping:

| FROM BITS | → TO BITS | (1302) |
|---|---|---|
| bits 0-2, filter sequence | bits 1-2, column address | |
| bit 0, vertical count | bit 0, column address | |
| bits 1-2, vertical count | bits 7-8, column address | |
| bits 3-7, vertical count | bits 4-8, row address | |
| bits 0-3, horizontal count | bits 3-6, column address | |
| bits 4-7, horizontal count | bits 0-3, row address | |

After each frame buffer cluster is read from the frame buffer 106, it is latched into the vertical filter circuit 802 indicated by the filter sequence 1301, and the filter sequence 1301 is incremented. Every time the filter sequence 1301 cycles back to zero the frame buffer vertical count 909 is incremented. Every 32 cycles, bit 3 of the frame buffer vertical count 909 changes, requiring a new RAS cycle.

A hidden refresh cycle is added to every fourth new RAS cycle.

When the frame buffer vertical count 909 reaches a programmed limit, indicating that the bottom of the image has been reached, the frame buffer vertical count 909 is cleared, the frame buffer horizontal count 908 is incremented, and the vertical filter circuits 802 are reset to start a new set of four vertical columns.

Figure 14:
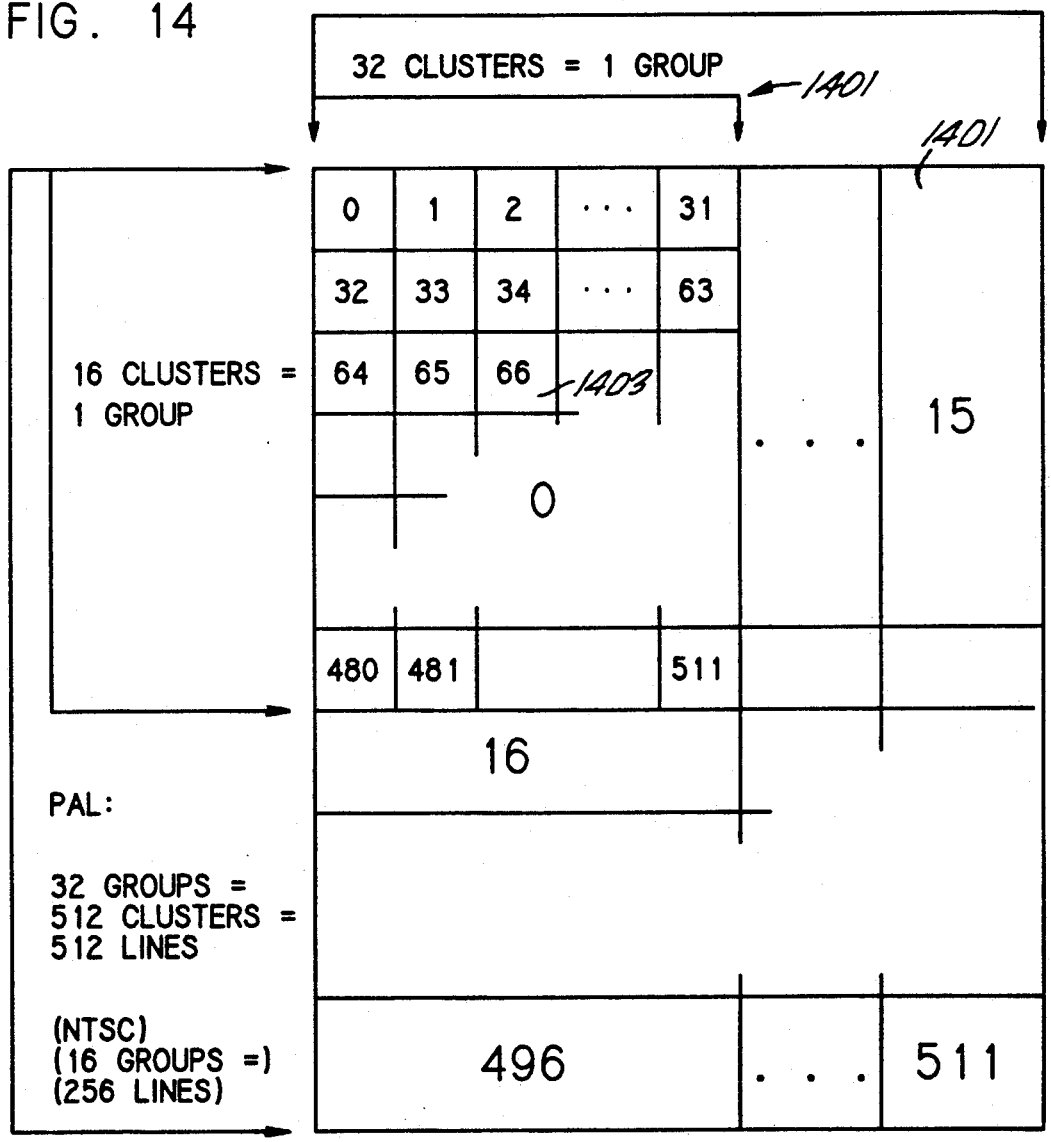
FIG. 14 shows the address organization of the field buffer memory.

FIG. 14 shows the address organization of the field buffer 108 memory.

The field buffer 108 is also organized so as to read data quickly in vertical columns and to write data quickly in horizontal rows. In the field buffer 108, data is stored in horizontal units of two pixels (a "field buffer cluster"). The field buffer 108 memory holds two complete fields.

In a preferred embodiment, the image data is divided into 512 (1024 for PAL) rectangular field buffer groups 1401, each corresponding to a field buffer row address 1402 (see FIG. 15) for the field buffer 108 memory. Each rectangular field buffer group 1401 is further divided into 512 field buffer locations 1403, each corresponding to a field buffer column address 1404 (see FIG. 15) for the field buffer 108 memory. Each field buffer location 1403 stores a single field buffer cluster. This allows both horizontal and vertical memory accesses to access a large number of field buffer locations 1403 before the overhead of a new RAS memory cycle is needed.

In a preferred embodiment, the field buffer 108 memory capacity may be 2 field × 256 lines × 1024 pixels (2 fields × 512 lines × 1024 pixels for PAL).

A field buffer read address generator 1405 (which may comprise an independent state machine) controls the field buffer 108 read addresses; in like manner, a field buffer write address generator 1406 (which may comprise an independent state machine) controls the field buffer 108 write addresses. In a preferred embodiment, a field buffer idle control 1407 (which may comprise a third independent state machine) arbitrates between read and write operations, as is well known in the art, and controls the field buffer 108 memory. Both the field buffer read address generator 1405 and the field buffer write address generator 1406 must request the field buffer 108 memory controller for access to the field buffer 108 memory. At that point a read or write operation will proceed until a new RAS cycle is required and the other address generator is requesting access.

The field buffer write address generator 1406 is driven by the frame buffer read address generator 905. Each time the vertical filters 107 finish a set of four columns, the frame buffer read address generator 905 causes the field buffer write address generator 1406 to start writing those columns from the vertical filter output FIFOs 803. If the frame buffer read address generator 905 finishes a set of columns before the field buffer write address generator 1406 has written the previous set, the frame buffer 106 waits for the field buffer 108 to finish. This prevents the vertical filter output FIFOs 803 from overflowing.

The field buffer read address generator 1405 is driven by control signals from the encoder 109. The field buffer horizontal count 1504 and the field buffer vertical count 1503 are reset at the beginning of each output field. At the end of each output line the field buffer horizontal count 1504 is cleared and the field buffer vertical count 1503 is incremented.

Figure 15:
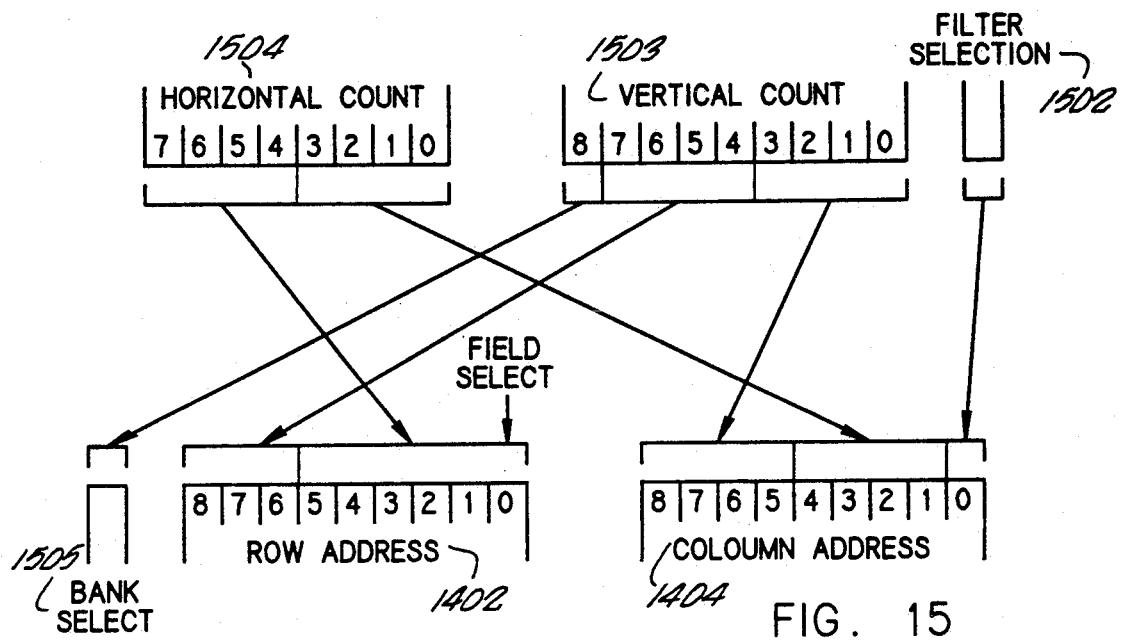
FIG. 15 shows a field buffer write address generator schema.

FIG. 15 shows a field buffer write address generator 1406 schema.

A field select bit 1501, a filter selection bit 1502, a field buffer vertical count 1503 and a field buffer horizontal count 1504 are combined to produce the field buffer column address 1404, the field buffer row address 1402 and a bank select bit 1505. The following table shows the bit mapping:

| FROM BITS | → TO BITS | (1506) |
|---|---|---|
| filter selection bit | bit 0, column address | |
| field select bit | bit 0, row address | |
| bits 0-3, vertical count | bits 5-8, column address | |
| bits 4-7, vertical count | bits 5-8, row address | |
| bit 8, vertical count | bank select bit | |
| bits 0-3, horizontal count | bits 1-4, column address | |
| bits 4-7, horizontal count | bits 1-4, row address | |

All of these "from bits" (the field select bit 1501, the filter selection bit 1502, the field buffer vertical count 1503, and the field buffer horizontal count 1504) are cleared when a new vertical filtering operation is started by the microprocessor 111.

The filter selection bit 1502 alternates between pairs of vertical filter sections. A field buffer cluster (two pixels) output by each pair is read and written into the field buffer 108. Each time the filter selection bit 1502 toggles to "0", the field buffer vertical count 1503 is incremented. Every 32 cycles the resulting field buffer row address 1402 is changed and a new RAS cycle is required. A hidden refresh cycle is added to every fourth such new RAS cycle.

When the field buffer vertical count 1503 reaches a preset limit, it is cleared and the field buffer horizontal count is incremented. The field buffer write address generator may then pause to wait for the vertical filter 107 to finish another set of four columns. The field select bit 1501 selects which of two fields is selected; it is provided by the field buffer 108 memory controller.

Figure 16:
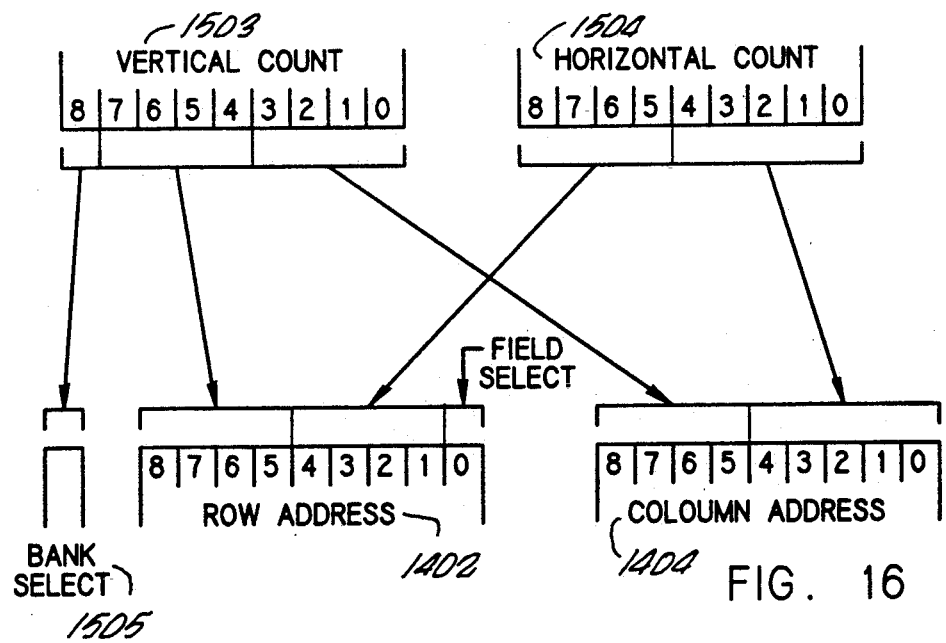
FIG. 16 shows a field buffer read address generator schema.

FIG. 16 shows a field buffer read address generator schema.

The field buffer horizontal count 1504, the field buffer vertical count 1503 and the field select bit 1501 are combined to produce the field buffer column address 1404, the field buffer row address 1402 and the bank select bit 1505. The following table shows the bit mapping:

| FROM BITS | → TO BITS | (1601) |
|---|---|---|
| bits 0-4, horizontal count | bits 0-4, column address | |
| bits 5-8, horizontal count | bits 1-4, row address | |
| bits 0-3, vertical count | bits 5-8, column address | |
| bits 4-7, vertical count | bits 5-8, row address | |
| bit 8, vertical count | bank select bit | |
| field select bit | bit 0, row address | |

The field buffer horizontal count 1504 is incremented each memory cycle. Every 32 cycles the resulting field buffer row address 1402 changes and a new RAS cycle is required. A hidden refresh cycle is added to every fourth such new RAS cycle. When the field buffer horizontal count 1504 reaches a preset limit, it is cleared and the field buffer vertical count 1503 is incremented. The field buffer read address generator 1405 then pauses until another scan line is needed by the encoder 109.

Data output by the field buffer 108 is transmitted to an encoder FIFO 1602, which adapts the bursty data output by the field buffer 108 into a steady stream, as required by the encoder 109. In a preferred embodiment, the field buffer read address generator 1405 tries to stay a full scan line ahead of the encoder 109. At the beginning of each field the first scan line is transmitted to the encoder FIFO 1602. As the encoder FIFO 1602 is emptied by the encoder 109, the field buffer read address generator 1405 begins to refill it with the next scan line.

Encoder Module

Figure 17A:
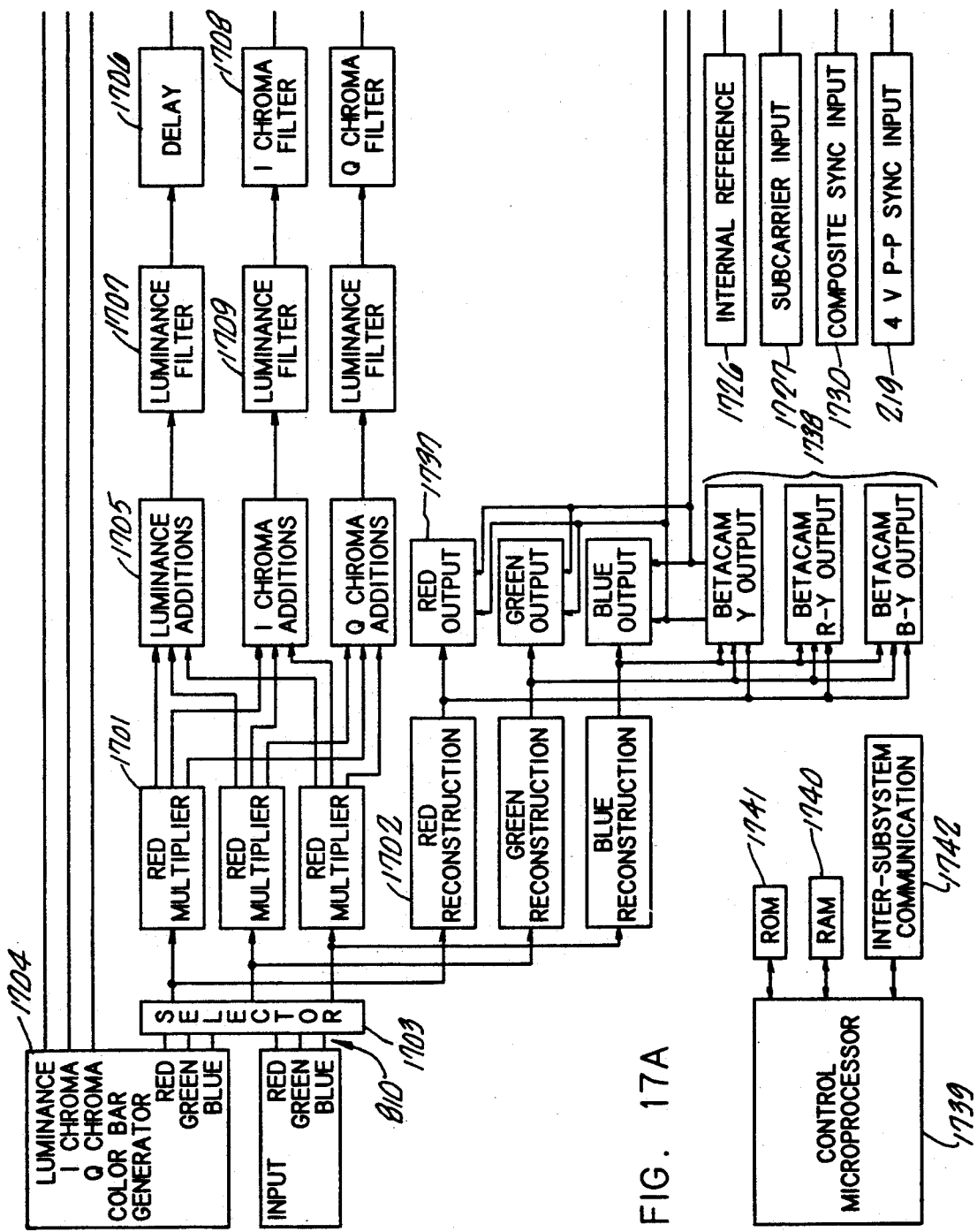

FIG. 17 shows a block diagram of the encoder module 203.

The encoder module 203 receives three color components (R, G and B) by means of the OUTPUT DATA signal lines 810, which are coupled to inputs of a set of R, G and B multiply circuits 1701 and of a set of R, G and B reconstruction circuits 1702, by means of a first encoder selector 1703. A color bar generator 1704 has a set of R, G and B outputs which are also coupled to inputs of the first encoder selector 1703.

A set of outputs of the R, G and B multiply circuits 1701 are cross-coupled to inputs of a set of Y (luminance), I and Q (chroma) addition circuits 1705. An output of the Y addition circuit 1705 is coupled to a first delay circuit 1706 by means of a Y filter 1707, while a set of outputs of the I and Q addition circuits 1705 are coupled to corresponding inputs of a set of absolute value ROMs 1708 by means of a set of I and Q filters 1709.

A set of first inputs of a set of second encoder selectors 1710 is coupled to a set of Y (luminance), I and Q (chroma) outputs of the color bar generator 1704. A set of second inputs of the second encoder selectors 1710 are coupled to inputs of the first delay circuit 1706 and the absolute value ROMs 1708 respectively.

A set of I and Q outputs of a subcarrier synthesizer 1711 are coupled to first inputs of a set of I and Q encoder multipliers 1712. A set of outputs of the I and Q second encoder selectors 1710 are coupled to second inputs of the I and Q encoder multipliers 1712, while an output of the Y second encoder selector 1710 is coupled to an input of a second delay circuit 1713. An output of each of the I and Q encoder multipliers 1712 is coupled to an input of a corresponding rescale RAM 1714; the output of each rescale RAM 1714 is coupled to an input of an adder 1715. An output of the adder 1715 is coupled to an input of a first adjust ROM 1716.

An output of the second delay circuit 1713 is coupled to an input of a luminance reconstruction circuit 1717, while an output of the first adjust ROM 1716 is coupled to an input of a chrominance reconstruction circuit 1718. An output of the luminance reconstruction circuit 1717 is coupled to an input of a super-VHS Y output circuit 1719 and to an input of a composite output circuit 1720, while an output of the chrominance reconstruction circuit 1718 is coupled to an input of a super-VHS C output circuit 1721 and to an input of the composite output circuit 1720.

The Q output of the subcarrier synthesizer 1711 is also coupled to an input of a second adjust ROM 1722. An output of the second adjust ROM 1722 is coupled to an input of a subcarrier reconstruction circuit 1723. An output of the subcarrier reconstruction circuit 1723 is coupled to a reference output terminal 1724 and to a first input of a third encoder selector 1725.

An internal reference value 1726 and a subcarrier input terminal 1727 are coupled to inputs of a first staged selector 1728; an output of which is coupled to a first input of a second staged selector 1729. A composite sync input 1730 and the 4VPP SYNC IN terminal 219 are coupled to inputs of a third staged selector 1731, an output of which is coupled to a second input of the second staged selector 1729 and to an encoder sync separator 1732.

An output of the encoder sync separator 1732 is coupled to an input of a sync generator/gen-lock circuit 1733. An output of the sync generator/gen-lock circuit 1733 is coupled to a second input of the third encoder selector 1725. An output of the third encoder selector 1725 is coupled to a first input of an encoder phase-locked loop 1734 (comprising a phase comparator, a loop filter, and a voltage-controlled oscillator, as is well known in the art).

An output of the second staged selector 1729 is coupled to a second input of the encoder phase-locked loop 1734. An output of the encoder phase-locked loop 1734 is coupled to a set of clock distribution circuits 1735.

A set of outputs of the sync generator/gen-lock circuit 1733 are coupled to corresponding inputs of a sync and pedestal shaping circuit 1736. A set of outputs of the sync and pedestal shaping circuit 1736 are coupled to corresponding inputs of the super-VHS Y output circuit 1719 and the composite output circuit 1720.

A set of outputs of the R, G and B reconstruction circuits 1702 are coupled to corresponding inputs of a set of R, G and B output circuits 1737, while all the outputs of the R, G and B reconstruction circuits 1702 are coupled to a set of Y, R-Y and B-Y Betacam output circuits 1738. A set of outputs of the sync and pedestal shaping circuit 1736 are coupled to corresponding inputs of the R, G and B output circuits 1737 and the Y Betacam output circuit 1738.

An encoder microprocessor 1739 operates in conjunction with an encoder RAM 1740, an encoder ROM 1741, and an intersubsystem communication circuit 1742, to control the encoder module 203.

Control Module

Figure 18A:
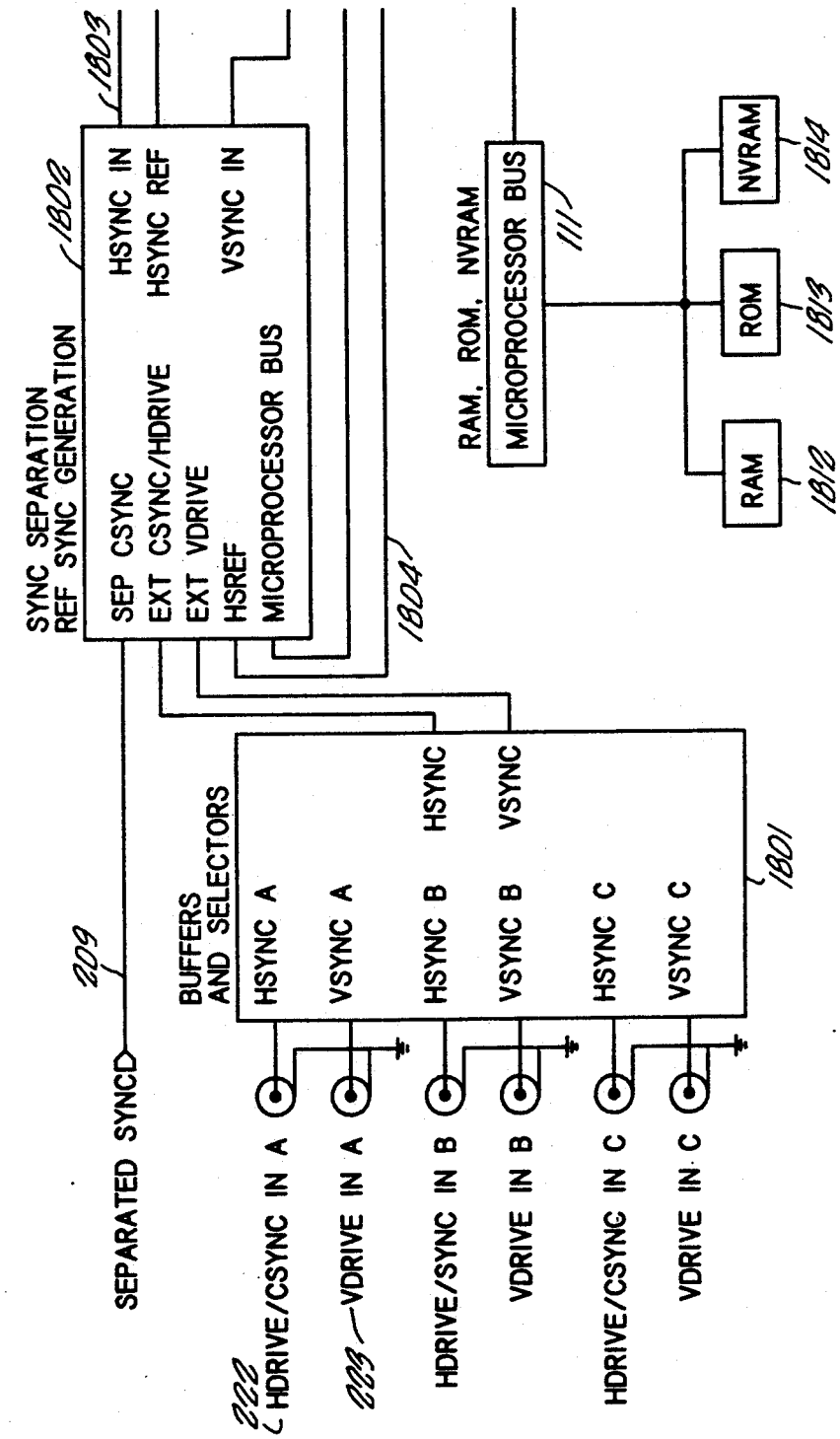
FIGS. 18A-18B show block diagrams of the control module.
Figure 18B:
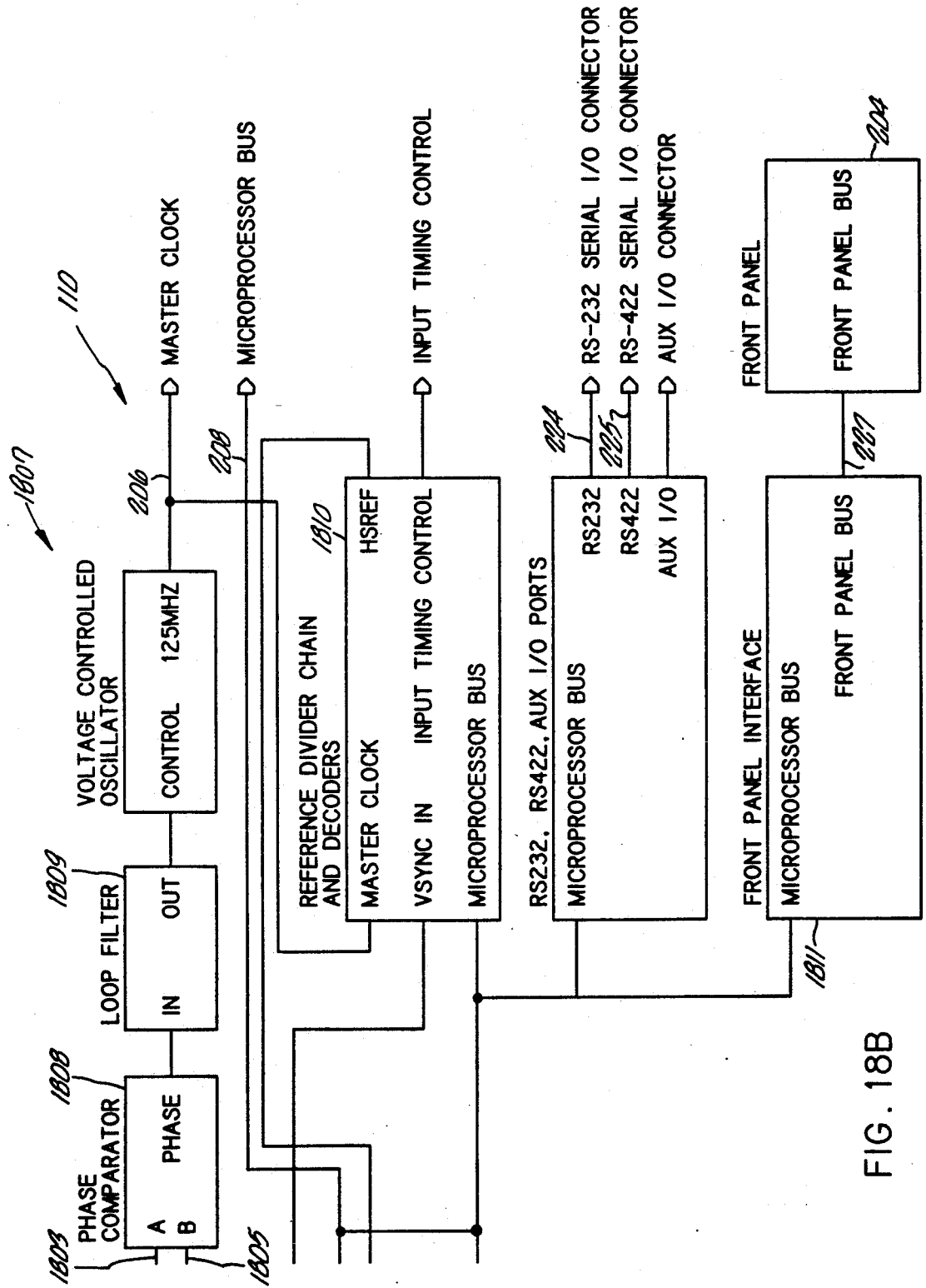

FIG. 18 shows a block diagram of the control module 110.

The HDRIVE/CSYNC IN terminals 222 A, B and C and the VDRIVE IN terminals 223 A, B and C are coupled to respective inputs of a buffer/selector circuit 1801. An HSYNC output and a VSYNC output of the buffer/selector circuit 1801 are coupled to corresponding inputs of a sync separation circuit 1802. The SEPARATED SYNC signal line 209 is coupled to an input of the sync separation circuit 1802 and may be selected by the sync separation circuit 1802 for use as a sync signal, as is well known in the art.

The sync separation circuit 1802 separates a horizontal sync from the sync source it selected, and generates a reference sync. The horizontal sync is filtered by the sync separation circuit 1802 to remove any extraneous pulses (such as serration and equalization pulses), as is well known in the art; the result is output on an HSYNCIN signal line 1803.

The sync separation circuit 1802 generates a reference horizontal sync from an HSREF input 1804. This reference sync has pulses removed which correspond to any missing pulses (such as the vertical sync) on the HSYNCIN signal line 1803; the result is output on an HSYNCREF signal line 1805.

The sync separation circuit 1802 also separates the vertical sync from the sync source it selected; the result is output on a VSYNCIN signal line 1806.

The HSYNCIN signal line 1803 and the HSYNCREF signal line 1805 are coupled in series with a phase-locked loop 1807 (comprising a phase comparator 1808, a loop filter 1809, and a reference divider circuit 1810, as is well known in the art). An output of the phase-locked loop 1807 is coupled to the MASTER CLOCK signal line 206. An input of the reference divider circuit 1810 is coupled to the MICROPROCESSOR BUS 208, as is the microprocessor 111, the RS-232 serial connector 224, the RS-422 serial connector 225, and a front-panel interface circuit 1811. The front-panel interface circuit 1811 is coupled to the front-panel operator controls 204 by means of the FRONT PANEL BUS signal line 227.

The microprocessor 111 operates under software control in conjunction with a RAM 1812, a ROM 1813, and a non-volatile RAM (NVRAM) 1814. Software to control the microprocessor 111 may be stored in the ROM 1813 and accessed by the microprocessor 111 during ordinary operation, as is well known in the art; calculated values may be stored in the RAM 1812 or the NVRAM 1814 and accessed by the microprocessor 111 during ordinary operation, as is well known in the art. It would be clear to those of ordinary skill in the art, after perusal of the specification, drawings and claims herein, that modification of a standard microprocessor system to perform the control functions disclosed herein would be a straightforward task and would not require undue experimentation.

The microprocessor 111 controls the horizontal filter module 201, the vertical filter module 202, and the encoder module 203, by means of the MASTER CLOCK signal line 206, the INPUT TIMING CONTROL signal line 207, and the MICROPROCESSOR BUS 208. The microprocessor 111 effects its control by triggering timing signals and by adjusting parameter values which are stored in memory in each module.

Generally speaking, the horizontal filter module 201 operates at a horizontal frequency of the input image format, and is therefore timing controlled by the microprocessor 111. As complete horizontal lines of horizontal filtered data become available on the HORIZONTAL FILTERED DATA signal line 317, the horizontal filtered data is transmitted to the vertical filter module 202. The vertical filter module 202 operates on input in synchrony with horizontal filter module 201, and on output at a frame rate of the output image format. It is therefore timing controlled on input by the microprocessor 111, and on output by the encoder module 203.

Microprocessor System Control

The microprocessor 111 controls the horizontal filter modules 201, the vertical filter modules 202 and the encoder module 203 by reading and writing control registers inside those modules, which appear to the microprocessor 111 as locations in its address space. This method of microprocessor control of peripheral devices is well known in the art.

In a preferred embodiment, the horizontal filter module 201 has memory locations assigned to control the horizontal filter blocks 314. In a preferred embodiment, each horizontal filter block 314 comprises two filter circuits 318, so each horizontal filter block 314 is assigned two sets of memory locations. Two further sets of memory locations are also allocated for simultaneous control of all horizontal filter blocks 314 at once. In a preferred embodiment, eight memory locations are allocated for each filter circuit 318. In addition, memory locations may be allocated for other parameters such as input port selection and gain relay controls.

In a preferred embodiment, the vertical filter module 202 has memory locations assigned to control the vertical filter circuits 802. One set of eight memory locations controls each of four of the vertical filter circuits 802. A set of eight memory locations is also allocated for simultaneous control of all of the vertical filter circuits 802 at once. Memory locations are also allocated for control of the frame buffers 106, comprising two bits for each frame buffer 106, one indicating if the frame buffer 106 is idle, and one indicating if the frame buffer 106 is being read or written (if not idle).

The encoder module 203 is controlled by means of a pair of two address locations 1815 in the address space of the microprocessor 111, used to form a parallel communication channel with the encoder microprocessor 1739 in the encoder module 203. In a preferred embodiment, the 4-state Meuller handshake protocol, as is well known in the art, allows the microprocessor 111 and the encoder microprocessor 1739 to communicate by means of the two address locations 1815 without any special hardware. In a preferred embodiment, commands and data may be transmitted between the microprocessor 111 and the encoder microprocessor 1739. It would be clear to those of ordinary skill in the art, after perusal of the specification, drawings and claims herein, that modification of a standard microprocessor system to perform such a command structure as required by the control functions disclosed herein would be a straightforward task and would not require undue experimentation. Accordingly, the actual commands and data which may be transmitted are not disclosed herein.

The control module 110 also records data elements which are of general use for system control, and for controlling other and further elements of the image converter 101. However, it would be clear to those of ordinary skill in the art, after perusal of the specification, drawings and claims herein, that modification of a standard microprocessor system to comprise a different set of parameters consistent with the control functions disclosed herein would be a straightforward task and would not require undue experimentation.

Front-Panel Operator Controls

FIG. 19 shows a diagram of the front-panel operator controls 204.

In a preferred embodiment, the front panel may comprise a visual display 1901, capable of showing alphanumeric characters to an operator, a set of visual indicators 1902, each capable of showing lighted on/off indications to the operator and for the operator to use to input commands and data, and a set of input pushbuttons 1903, for the operator to use to input commands and data, by selecting one or more menu selections as shown on the visual display 1901.

In a preferred embodiment, the visual display 1901 may comprise a 2-line by 40-character display, each position of which may display one character selected from the ASCII character set, plus Greek and other special characters. Displays of this class are well known in the art.

In a preferred embodiment, the visual indicators 1902 may comprise a set of A, B and C indicators 1904 for selecting and for indicating one or more input channels, a TEST indicator 1905 for selecting and for indicating a test pattern, a STATUS indicator 1906 for indicating a status condition, a FREEZE indicator 1907 for selecting and for indicating a "Freeze Frame" condition, a SET-UP indicator 1908 for selecting a "Set Up" command, and a pair of PREV and NEXT indicators 1909 for selecting the previous and next selection submenus in a selection menu respectively.

In a preferred embodiment, the pushbuttons 1903 may comprise four of them 1903 for selecting one or more entries in a selection menu. The use of selection menus is well known in the art. The pushbuttons may comprise four of them 1903 labelled "++", "+", "−" and "− −" for adjusting operating parameters up and down, as described herein.

The microprocessor 111 may control and/or respond to the operator controls 204 by means of software programs and memory data, as is well known in the art. The microprocessor 111 may implement numerous operator commands, and may allow the operator to alter and/or display numerous data elements and operating parameters of the invention. It would be clear to those of ordinary skill in the art, after perusal of the specification, drawings and claims herein, that modification of a standard microprocessor system to comprise a different set of commands, data elements and operating elements consistent with the control functions disclosed herein would be a straightforward task and would not require undue experimentation.

In a preferred embodiment, the operator controls 204 may also comprise text commands, input and output for which may be performed by means of the RS-232 serial connector 224 or the RS-422 serial connector 225. Communication by means of the RS-232 serial connector 224 or the RS-422 serial connector 225 is well known in the art.

Alternative Embodiments

While preferred embodiments are disclosed herein, many variations are possible which remain within the concept and scope of the invention, and these variations would become clear to one of ordinary skill in the art after perusal of the specification, drawings and claims herein.

For example, it would become clear to one of ordinary skill in the art that the filter circuit shown herein (as embodied in the horizontal filter block and the vertical filter block) may be used in other and further applications, including those not intended for the same purpose as the real-time video image converter shown herein. Moreover, the image converter shown herein may be used with other and further circuits, including other and further filter circuits not shown herein but having similar effect or purpose.

For a second example, it would become clear to one of ordinary skill in the art that alternate embodiments of the invention may comprise input image formats other than RGB format, and output image formats other than NTSC and PAL formats, and that such alternate embodiments remain within the concept and scope of the invention.

We claim:
1. A device for converting an image in real time from an input format to an output format, said input and output formats each having a frame rate and a plurality of lines per frame, said device comprising:
 first means for converting a number of pixels per line into said output format by means of interpolation and decimation;
 second means for converting a frame rate into said output format; and
 third means for converting a number of lines per frame into said output format by means of interpolation and decimation, wherein said first means comprises an input port capable of being coupled to a signal in said input format;
a filter coupled to said input port;
an A/D converter coupled to said filter;
an input FIFO coupled to said A/D converter;
an filter circuit coupled to said input FIFO; and
an output FIFO coupled to said filter circuit.

2. A device for converting an image in real time from an input format to an output format, said input and output formats each having a frame rate and a plurality of lines per frame, said device comprising
first means for converting a number of pixels per line into said output format by means of interpolation and decimation;
second means for converting a frame rate into said output format; and
third means for converting a number of lines per frame into said output format by means of interpolation and decimation,
wherein said second means comprises
a plurality of frame buffers;
means for selecting at least one of said plurality of frame buffers for input, synchronous with a frame rate of said input format; and
means for selecting at least one of said plurality of frame buffers for output, synchronous with a frame rate of said output format.

3. A device for converting an image in real time from an input format to an output format, said input and output formats each having a frame rate and a plurality of lines per frame, said device comprising:
first means for converting said image to a first intermediate format by means of interpolation and decimation, said first intermediate format having a number of pixels per line equivalent to said output format;
second means for converting said image to a second intermediate format, said second intermediate format having a frame rate equivalent to said output format, said second means coupled to said first means; and
third means for converting said image to said output format by means of interpolation and decimation, said third means coupled to said second means.

4. A device for converting an image in real time from an input format to an output format, said input and output formats each having a frame rate and a plurality of lines per frame, said device comprising
a first plurality of filter sections for converting said image to a first intermediate format by means of interpolation and decimation, said first intermediate format having a number of pixels per line equivalent to said output format, each one of said first plurality of filter sections comprising an input FIFO, a filter circuit coupled to said input FIFO, and an output FIFO coupled to said filter circuit;
a plurality of frame buffers for converting said image to a second intermediate format, said second intermediate format having a frame rate equivalent to said output format, said plurality of frame buffers coupled to said first plurality of filter sections; and
a second plurality of filter sections for converting said image to said output format by means of interpolation and decimation, said second plurality of filter sections coupled to said plurality of frame buffers, each one of said second plurality of filter sections comprising an input FIFO, a filter circuit coupled to said input FIFO, and an output FIFO coupled to said filter circuit;
wherein said image comprises a set of color components; wherein said first, second and third means operate on each one of said color components.

5. A method for converting an image in real time from an input format to an output format, said input and output formats each having a frame rate and a plurality of lines per frame, said method comprising the steps of
converting said image to a first intermediate format by means of interpolation and decimation, said first intermediate format having a number of pixels per line equivalent to said output format;
converting said image to a second intermediate format, said second intermediate format having a frame rate equivalent to said output format; and
converting said image to said output format by means of interpolation and decimation.

6. A method as in claim 5, wherein said image comprises a set of color components; wherein at least one of said steps of converting is performed on each one of said color components.

7. A method as in claim 6, comprising the step of combining said color components.

* * * * *